US011257176B1

(12) United States Patent
Baldassari

(10) Patent No.: US 11,257,176 B1
(45) Date of Patent: Feb. 22, 2022

(54) DYNAMIC USER INTERFACE OF A SORTING MANAGEMENT SYSTEM

(71) Applicant: United Parcel Service of America, Inc., Atlanta, GA (US)

(72) Inventor: Tony Baldassari, Lake Hopatcong, NJ (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 575 days.

(21) Appl. No.: 15/975,387

(22) Filed: May 9, 2018

Related U.S. Application Data

(60) Provisional application No. 62/503,614, filed on May 9, 2017.

(51) Int. Cl.
*G06Q 50/28* (2012.01)
*G06F 3/0482* (2013.01)
*G06Q 10/06* (2012.01)

(52) U.S. Cl.
CPC .......... *G06Q 50/28* (2013.01); *G06F 3/0482* (2013.01); *G06Q 10/063114* (2013.01)

(58) Field of Classification Search
None
See application file for complete search history.

(56) References Cited

U.S. PATENT DOCUMENTS

| | | | |
|---|---|---|---|
| 2008/0015884 A1* | 1/2008 | Jamula | G06Q 10/063114 705/330 |
| 2009/0281929 A1* | 11/2009 | Boitet | G06Q 10/08 705/28 |
| 2014/0013252 A1* | 1/2014 | Ehrler | G06Q 10/06 715/764 |
| 2014/0236660 A1* | 8/2014 | Cantor | G06Q 10/06313 705/7.23 |
| 2016/0171438 A1* | 6/2016 | Ladden | G06Q 10/06316 715/741 |

OTHER PUBLICATIONS

Luis et al, Getting Logistics Closer to End Users, 2014 (Year: 2014).*
Mitchell et al, UPS Small Sorts Configuration Module, 2009 (Year: 2009).*

* cited by examiner

*Primary Examiner* — Mohamed N El-Bathy
(74) *Attorney, Agent, or Firm* — Shook, Hardy & Bacon L.L.P.

(57) ABSTRACT

Identifiers are provided within a user interface, where the identifiers correspond to a management of sorting operations for sorting parcels to be shipped. Some aspects include determining whether shipping information has been uploaded by a particular time. In response to the determining, some aspects include providing a first status indicator within a first view of the user interface. The first status indicator indicates whether one or more users have uploaded the shipping information to computing devices by the particular time.

12 Claims, 15 Drawing Sheets

Figure 1:
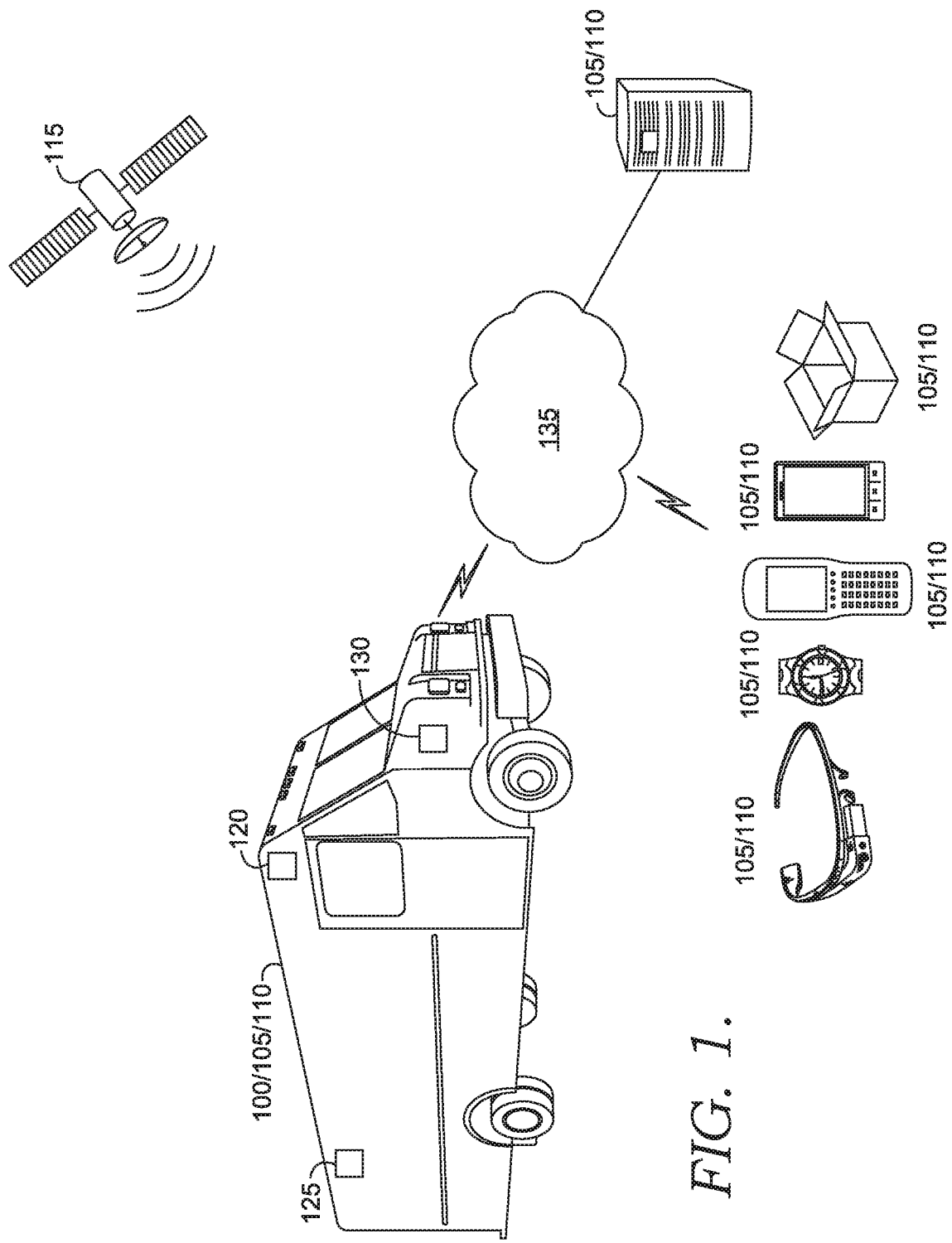

FIG. 10.

SERVICE MANAGER

| ITEM | PACKAGE | SCAN TIME | SCAN LOAD |
|---|---|---|---|
| EDC | 1Z10R3576895453721 | 3:19:00 PM | UPST95045E |
| OH | 1Z10R3576898395904 | 3:19:00 PM | UPST90376E |
| CO | 1Z5833716852711573 | 3:19:00 PM | UPST95045E |
| AES | 1Z7F6F796857627122 | 3:16:00 PM | UPST91075E |

1000

FIG. 11.

WORKFORCE MANAGER

| ITEM | DETAIL |
|---|---|
| OVER 8 | JANE DOE #1 IS OVER 8 |
| OVER 8 | JANE DOE #2 1 HOUR BEFORE 8 |
| PPH | JOHN DOE 13PPH |

1100

| DAILY TIMECARDS | WEEKLY SUMMARY | | | | | | | |
|---|---|---|---|---|---|---|---|---|
| SHOW 10 ENTRIES | | | | | | | | |
| EMP ID /RACF | LAST NAME | FIRST NAME | GTS SLIC | ACTIVE TODAY | EMPLOYMENT TYPE (F/T OR P/T) | PREVIOUS HRS | ODC START TIME | ODC END TIME | SOURCE | ACTION |
| 0050339 | DOE | JOHN I | 0701 | A | F | 0 | 19:00:00 | 22:15:00 | GTS | EDIT/DELETE |
| 0050527 | DOE | JOHN II | 0701 | A | F | 0 | 18:38:00 | 22:28:00 | GTS | EDIT/DELETE |
| 0051560 | DOE | JOHN III | 0701 | A | F | 0 | 19:15:00 | 22:17:00 | GTS | EDIT/DELETE |
| 0051876 | DOE | JANE I | 0701 | A | F | 0 | 18:31:00 | 22:46:00 | GTS | EDIT/DELETE |

*FIG. 12.*

EMPLOYEE WORK HOURS MANAGEMENT – LOCATION: 00709 (MEADOWLANDS)

DAILY TIMECARDS | WEEKLY SUMMARY

1300

1301

| WEEK ENDING | WEEKLY HOURS TO DATE | KEYED HOURS | WEEKLY HOURS FINALIZED? | ACTION |
|---|---|---|---|---|
| | 331.67 | 0.00 | COMPLETE | NOT AVAILABLE |
| | 542.82 | 0.00 | COMPLETE | NOT AVAILABLE |

SHOWING 1 TO 2 OF 2 ENTRIES

[PREVIOUS] [1] [NEXT]

*FIG. 13.*

FIG. 14A.

SORT MANAGEMENT – LOCATION: 00709 (MEADOWLANDS)

SORT PLANNING

| WEEK DAY | PLAN START TIME | PLAN DOWN TIME | ACTION |
|---|---|---|---|
| SUN | | | EDIT |
| MON | 17:00:00 | 23:00:00 | EDIT |
| TUE | | | EDIT |
| WED | | | EDIT |
| THR | | | EDIT |
| FRI | | | EDIT |
| SAT | | | EDIT |

FIG. 14B.

EDIT RECORD

START TIME (HH:MM:SS):
17:00:00

DOWN TIME (HH:MM:SS):
21:00:00

CLOSE    SAVE

FIG. 15.

LOCATION: 00759 (SADDLEBROOK)  SELECT SORT DATE: 2016-02-01  SORT CODE: ALL SORTS ▼  SUBMIT

VOLUME BY SYSTEM

| SOURCE | SHIPMENTS | PACKAGES |
|---|---|---|
| EDC | 149 | 152 |
| IDC | 489 | 676 |
| OPSYS DATA | 2 | 2 |
| UDC | 0 | 0 |
| TOTAL: | 640 | 830 |

EDC SUSPENSE TOTALS

| NAME | SHIPMENTS | PACKAGES |
|---|---|---|
| EDC SUSPENSE | 256 | 568 |
| EDC SUSPENSE SCANS | 5 | 5 |

HOLDS AND RELEASES

| NAME | SHIPMENTS | PACKAGES |
|---|---|---|
| ORIGIN HOLDS | 11 | 16 |
| ORIGIN RELEASES | 4 | 4 |
| EXPORT HOLDS | 0 | 0 |
| IMPORT HOLDS | 7 | 27 |

PRODUCT VOLUME

| NAME | SHIPMENTS | PACKAGES |
|---|---|---|
| PAPERLESS INVOICE | 227 | 288 |
| USER CREATED FORM | 1 | 1 |
| WORLDEASE VOLUME | 17 | 140 |

REGULATORY VOLUME

| NAME | SHIPMENTS | PACKAGES |
|---|---|---|
| AES SHIPMENTS | 18 | 34 |
| AES SUSPENSE | 0 | 0 |
| AES PENDING | 0 | 0 |

VOLUME BY SERVICE LEVEL

| SERVICE LEVEL | SHIPMENTS | PACKAGES |
|---|---|---|
| 01-WW EXPRESS | 121 | 124 |
| 02-SECOND DAY | 22 | 22 |
| 03-GROUND | 234 | 343 |
| 05-WW EXPEDITED | 119 | 156 |

VOLUME BY USER

| DATA CAPURE USER | SHIPMENTS | PACKAGES |
|---|---|---|
| NNJ1SRG – DOE JOHN V | 118 | 118 |
| NNJ1GEH – DOE JOHN VI | 93 | 146 |
| NNJ1KRP – DOE JOHN VII | 84 | 176 |
| NNJ1CEM – DOE JANE IV | 75 | 75 |

HOLDS AND RELEASES

| SHIPPER | SHIPMENTS | PACKAGES |
|---|---|---|
| 2E2A61-NOBEL | 103 | 103 |
| WR0454-RAB LIGHT | 33 | 86 |
| 7699YE-GLOBAL | 64 | 64 |
| D61775-AETREX | 42 | 44 |

DYNAMIC USER INTERFACE OF A SORTING MANAGEMENT SYSTEM

CROSS-REFERENCE TO RELATED APPLICATIONS

This application claims priority to U.S. Provisional Patent Application No. 62/503,614 entitled "SORTING MANAGEMENT SYSTEM," filed May 9, 2017, which is incorporated herein by reference in its entirety.

BACKGROUND

Parcels (e.g., packages, containers, letters, items, pallets or the like) may undergo various sorting processes as the parcel is moved from an origin to a destination as part of a shipping process. For example, between the origin and the destination, a parcel may be shipped to one or more intermediate facilities where the parcel may be processed and sorted before being shipped to its final destination. Processing and sorting may include various actions, such as culling where parcels are separated according to shape or other characteristics, capturing information from the parcel to retrieve shipping information (e.g., tracking number, destination address, etc.), organizing the parcels according to a shipment destination, and loading the parcels into a delivery vehicle. In an illustrative example, in some shipping processes, such as those involving international shipments, parcels may undergo an origin data capture (ODC) process, in which parcels are sorted and information associated with the parcels may be captured and/or verified to meet customs requirements. When a problem arises with some or all of these sorting processes, such as when a set of workers are not working due to illness, this can affect when these sorting tasks and shipment processes finish.

Typical user interfaces or other software technologies for sorting and managing parcels may include fields that passively track whether a parcel/shipment has met a time deadline or how many parcels/shipments have occurred. These technologies may further indicate that shipment or sorting date targets have been missed without any indication or determination that shipment or sorting date targets will be missed in the future or why shipment or sorting date targets were missed. These user interfaces may also be complicated and arduous to use for user navigation. Therefore, a need exists for a dynamic user interface that can predict when a target date associated with one or more sorting operations will be missed and why. A need also exists for user interfaces that include additional relevant views of information associated with one or more sorting operations, such as various status indicators. A need further exists for dynamic user interfaces that are intuitive to use thereby increasing user navigation speed.

SUMMARY

Various embodiments of the present disclosure are directed to a computer implemented method, an apparatus, and a computer program product. In one aspect, a computer-implemented method includes displaying, at a first time, a first status indicator within a first view of a user interface. The first status indicator can indicate that one or more sorting operations associated with one or more parcels will occur by a particular time. It can be predicted at a second time that at least one sorting operation will not occur by the particular time. In response to the predicting, the first status indicator can be changed to a second status indicator within the first view. The second status indicator may indicate that the at least one sorting operation will not occur by the particular time.

In another aspect, an apparatus includes at least one processor and at least one memory storing computer program code. The at least one memory and the computer program code can be configured to, with the at least one processor, cause the apparatus to perform the following operations. One or more identifiers can be provided within a user interface. The one or more identifiers may correspond to a management of one or more sorting operations for sorting one or more parcels to be shipped. It can be determined whether shipping information has been uploaded by a particular time. In response to the determining, a first status indicator can be provided within a first view of the user interface. The first status indicator can indicate whether one or more users have uploaded the shipping information to one or more computing devices by the particular time.

In yet another aspect, a computer program product includes at least one non-transitory computer-readable storage medium having computer-executable program code instructions stored therein. The computer-executable program code instructions comprises program code instructions configured to, when executed by a processor of a computing system, cause the computing system to perform the following operations. One or more identifiers can be displayed within a user interface. The one or more identifiers may correspond to a management of one or more sorting operations for sorting one or more parcels to be shipped. It can be determined whether one or more shipments or parcels that are on hold have been resolved within a particular time. In response to the determining, a first status indicator within a first view of the user interface can be displayed. The first status indicator may indicate whether the one or more shipments or parcels that are on hold have been resolved within the particular time.

BRIEF DESCRIPTION OF THE SEVERAL VIEWS OF THE DRAWING(S)

Reference will now be made to the accompanying drawings, which are not necessarily drawn to scale, and wherein:

FIG. 1 schematically depicts a system that can be used to practice various embodiments herein.

Figure 2:
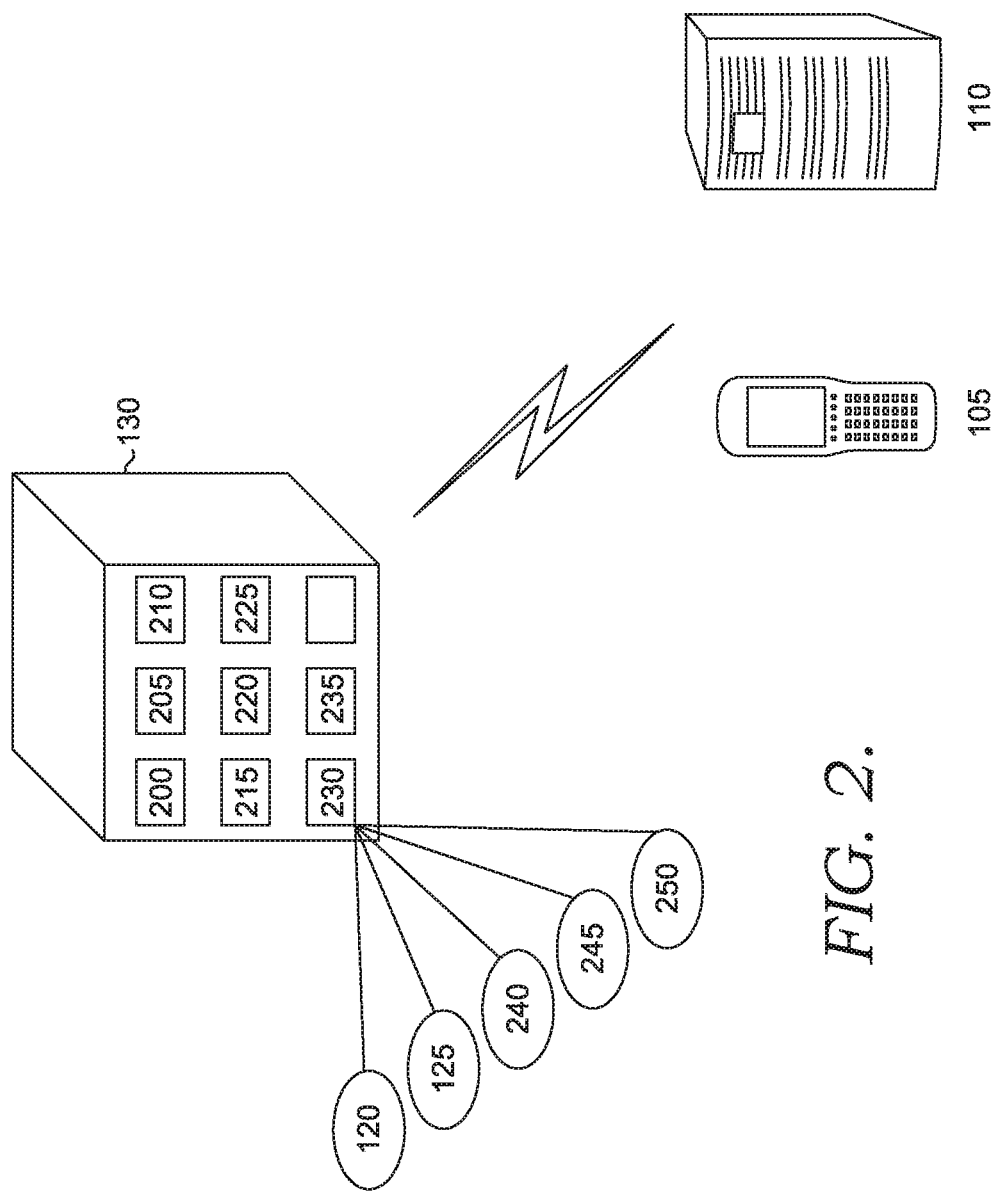

FIG. 2 schematically depicts an information/data collection device that may be used in association with certain embodiments herein.

Figure 3:
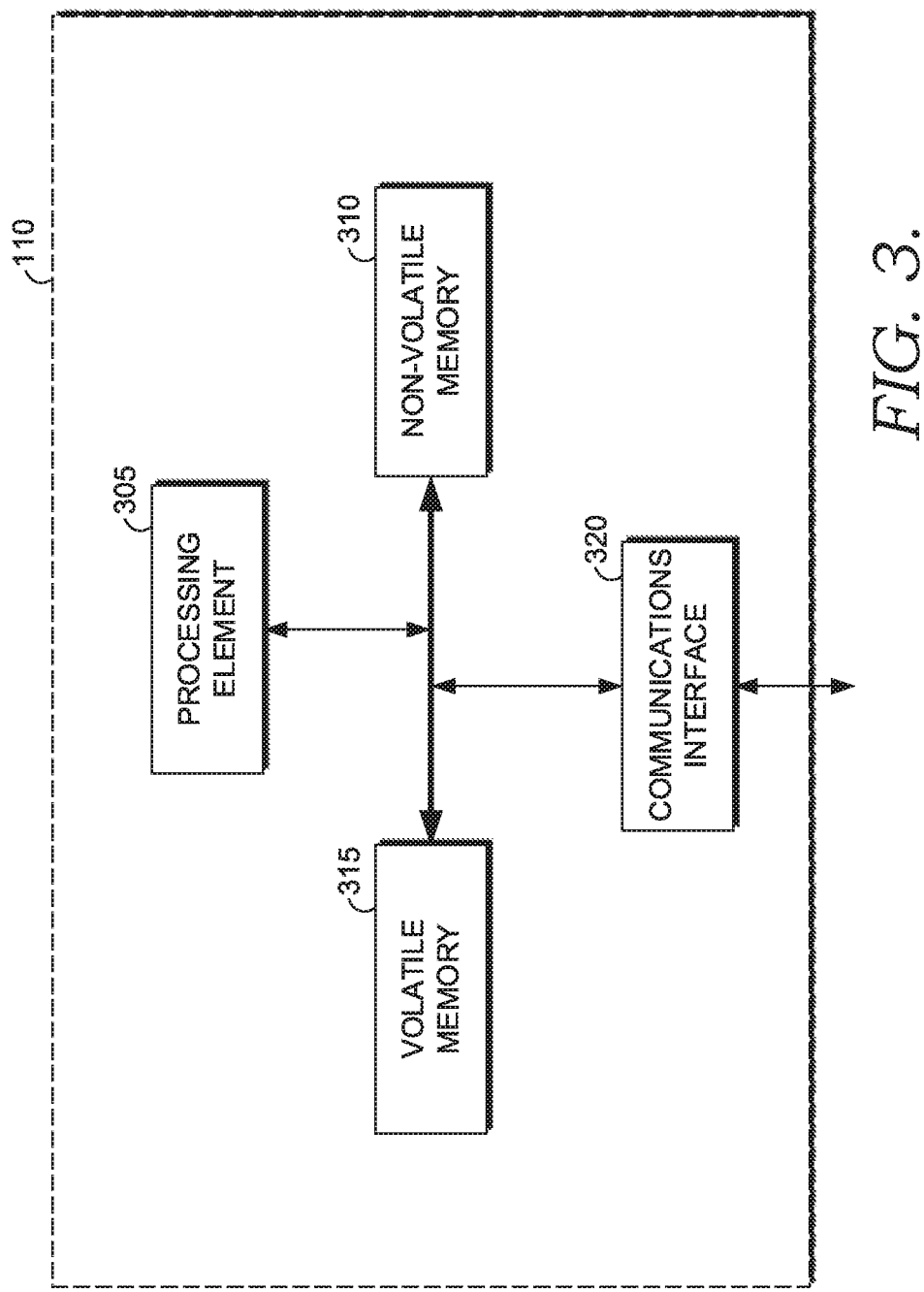

FIG. 3 schematically depicts central computing entity in accordance with certain embodiments herein.

Figure 4:
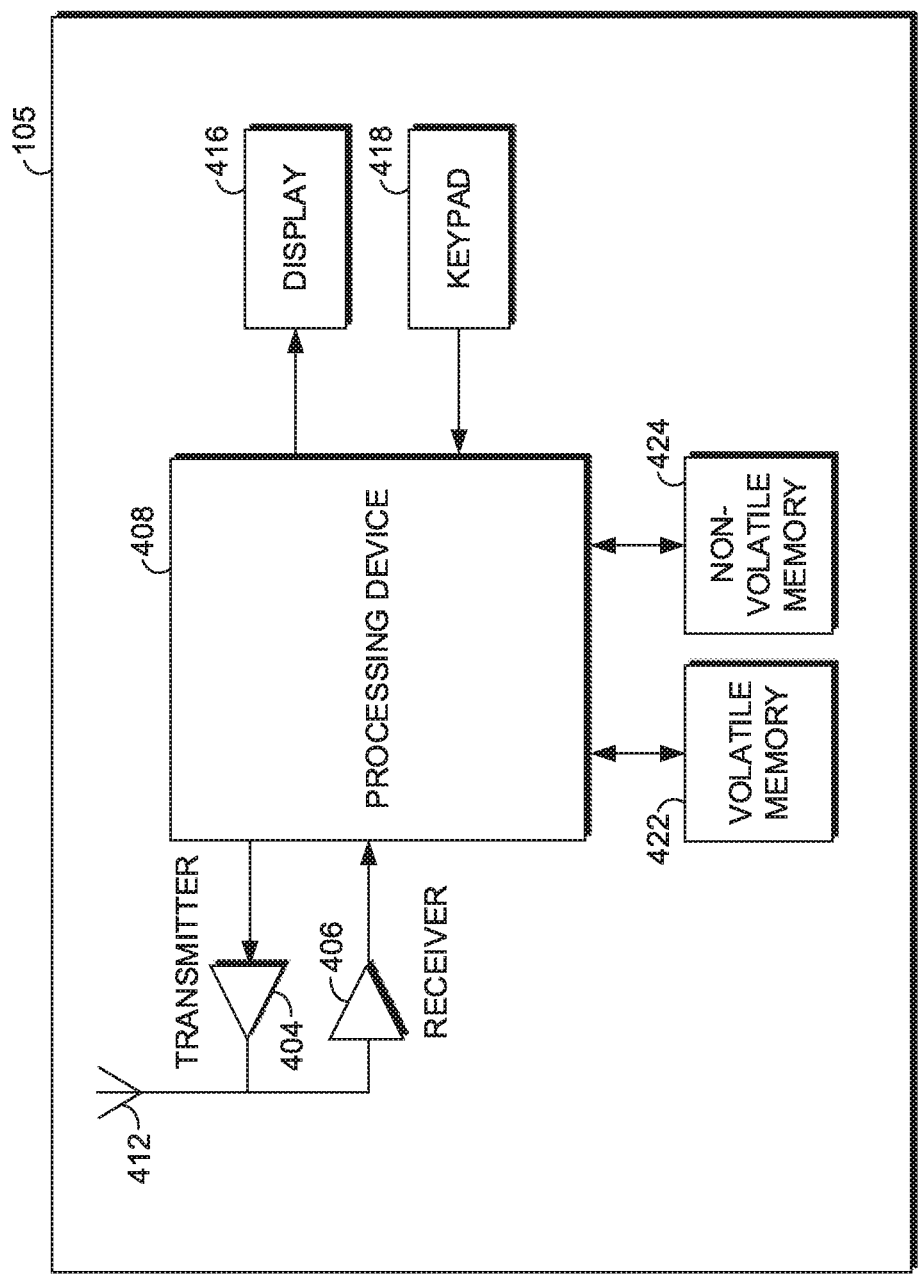

FIG. 4 schematically depicts a mobile computing entity in accordance with certain embodiments herein.

Figure 5:
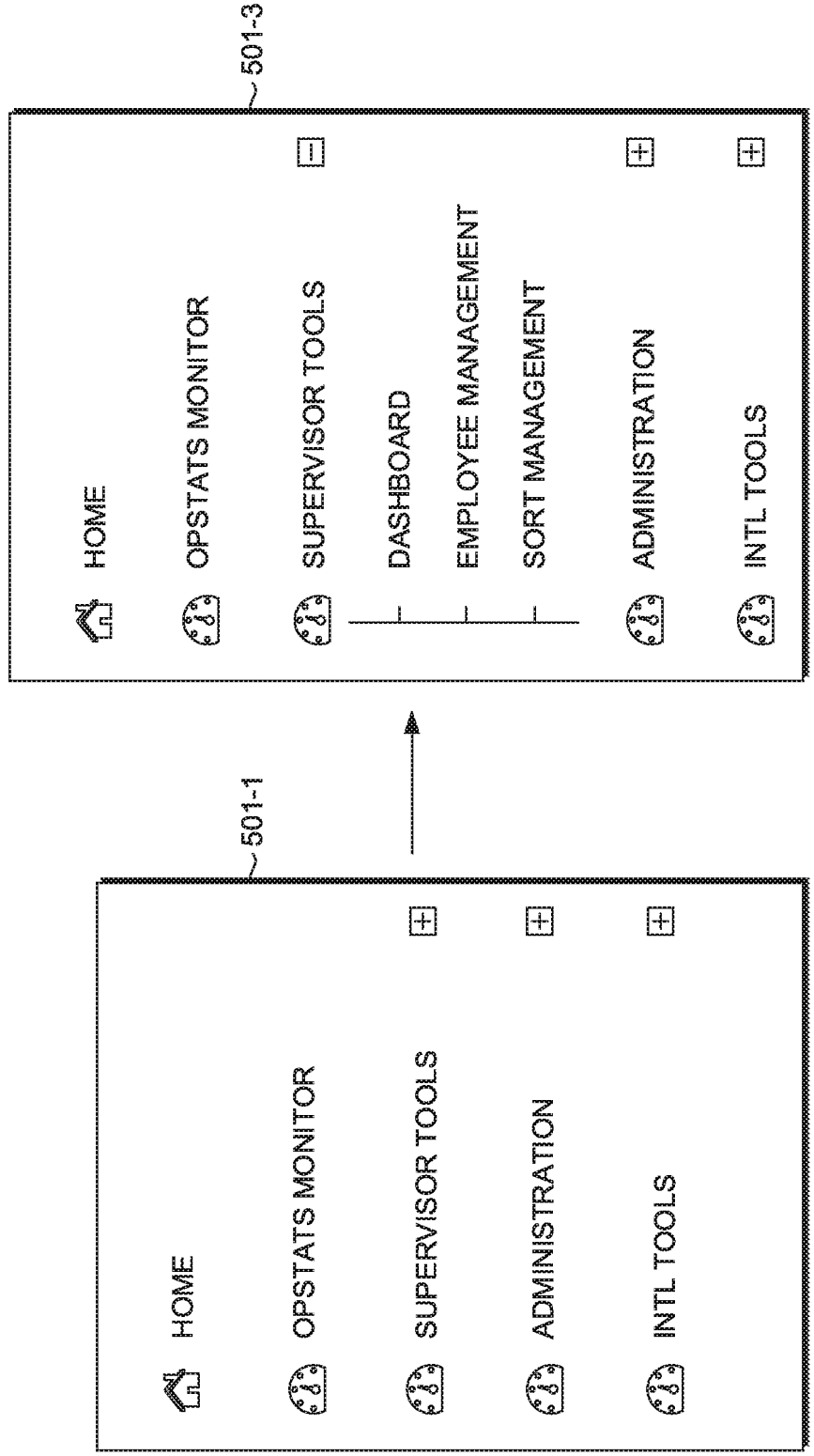

FIG. 5A schematically depicts a home screen of a sorting management system user interface, according to certain embodiments herein.

FIG. 5B schematically depicts another view of the home screen of the sorting management system user interface of FIG. 5A, according to certain embodiments herein.

Figure 6:
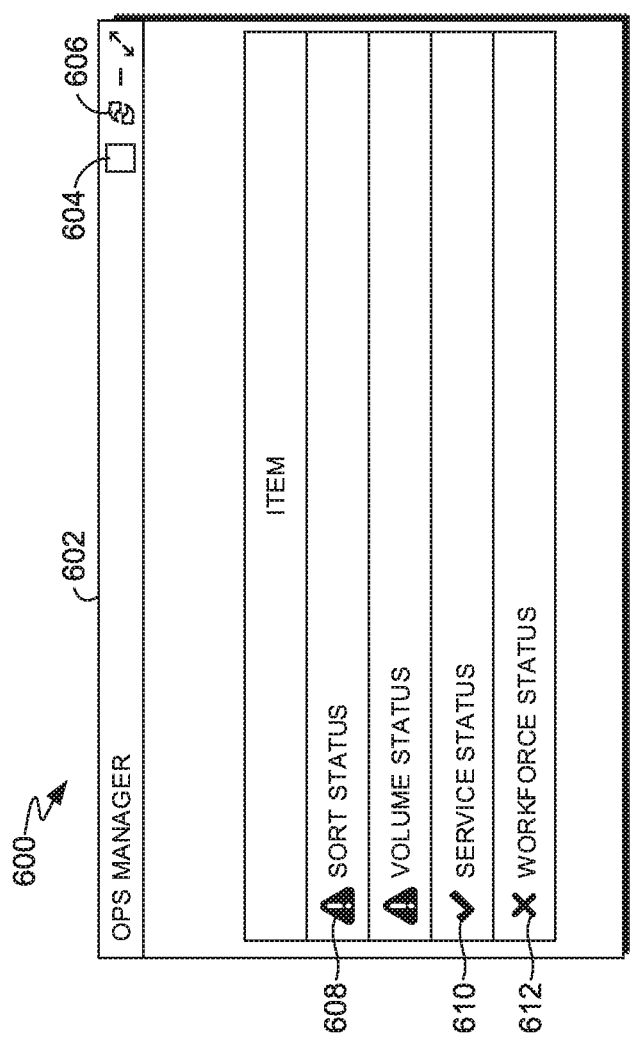

FIG. 6 schematically depicts a view of a supervisor tools module of a sorting management system user interface, according to certain embodiments herein.

Figure 7:
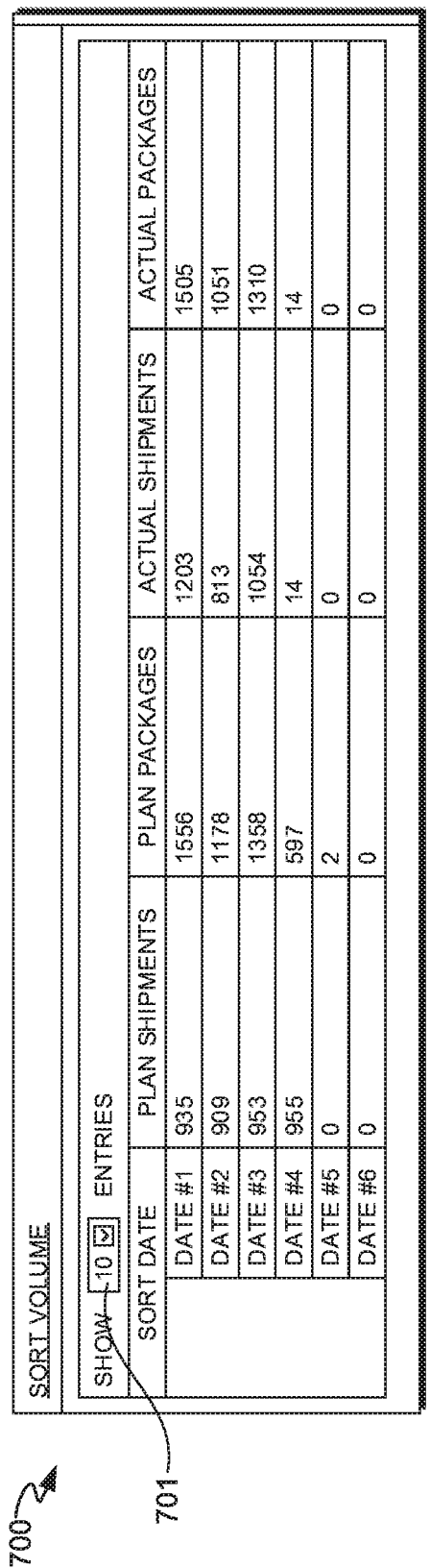

FIG. 7 schematically depicts a sort volume view of a sorting management system user interface, according to certain embodiments herein.

Figure 8:
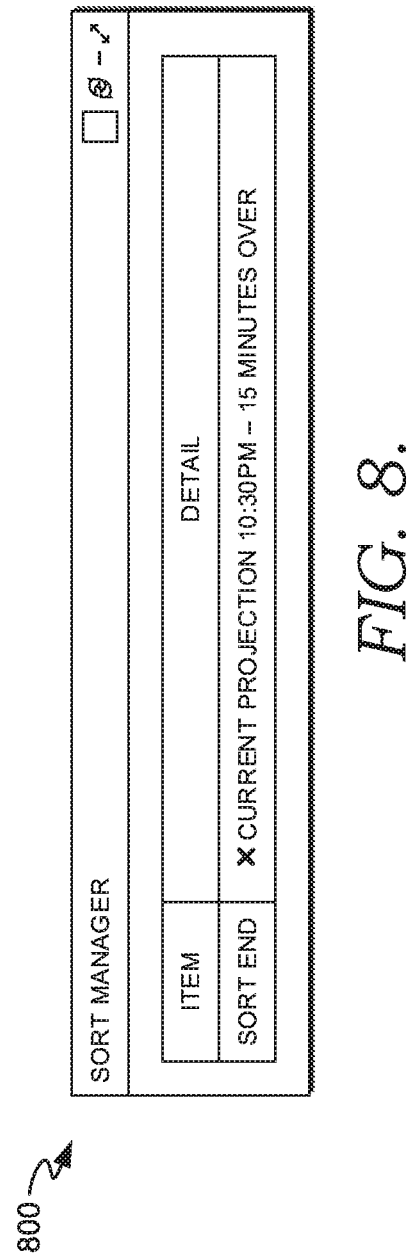

FIG. 8 schematically depicts a sort manager view of a sorting management system user interface, according to certain embodiments herein.

Figure 9:
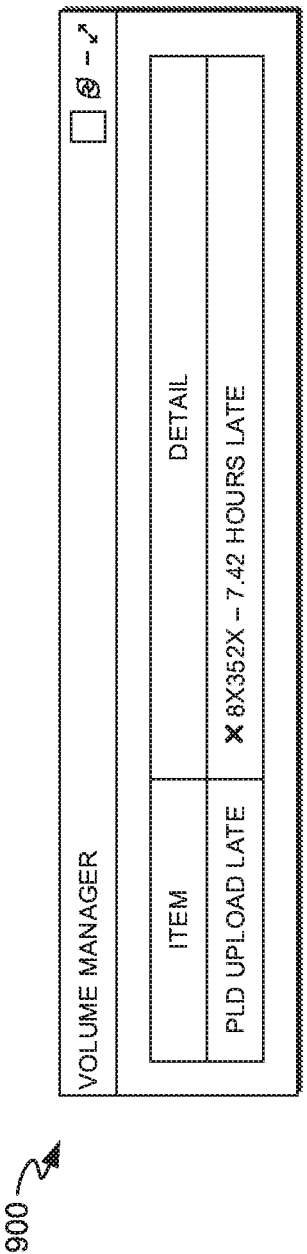

FIG. 9 schematically depicts a volume manager view of the sorting management system user interface, according to certain embodiments herein.

FIG. 10 schematically depicts a service manager view of the sorting management system user interface, according to certain embodiments herein.

FIG. 11 schematically depicts a workforce manager view of the sorting management system user interface, according to certain embodiments herein.

FIG. 12 schematically depicts an employee management view of the sorting management system user interface, according to certain embodiments herein.

FIG. 13 schematically depicts an employee management view of the sorting management system user interface, according to certain embodiments herein.

FIG. 14A schematically depicts a sort management view of the sorting management system user interface, according to certain embodiments herein.

FIG. 14B schematically depicts a sort management view of the sorting management system user interface, according to certain embodiments herein.

FIG. 15 schematically depicts a view of the sorting management system user interface, according to certain embodiments herein.

Figure 16:
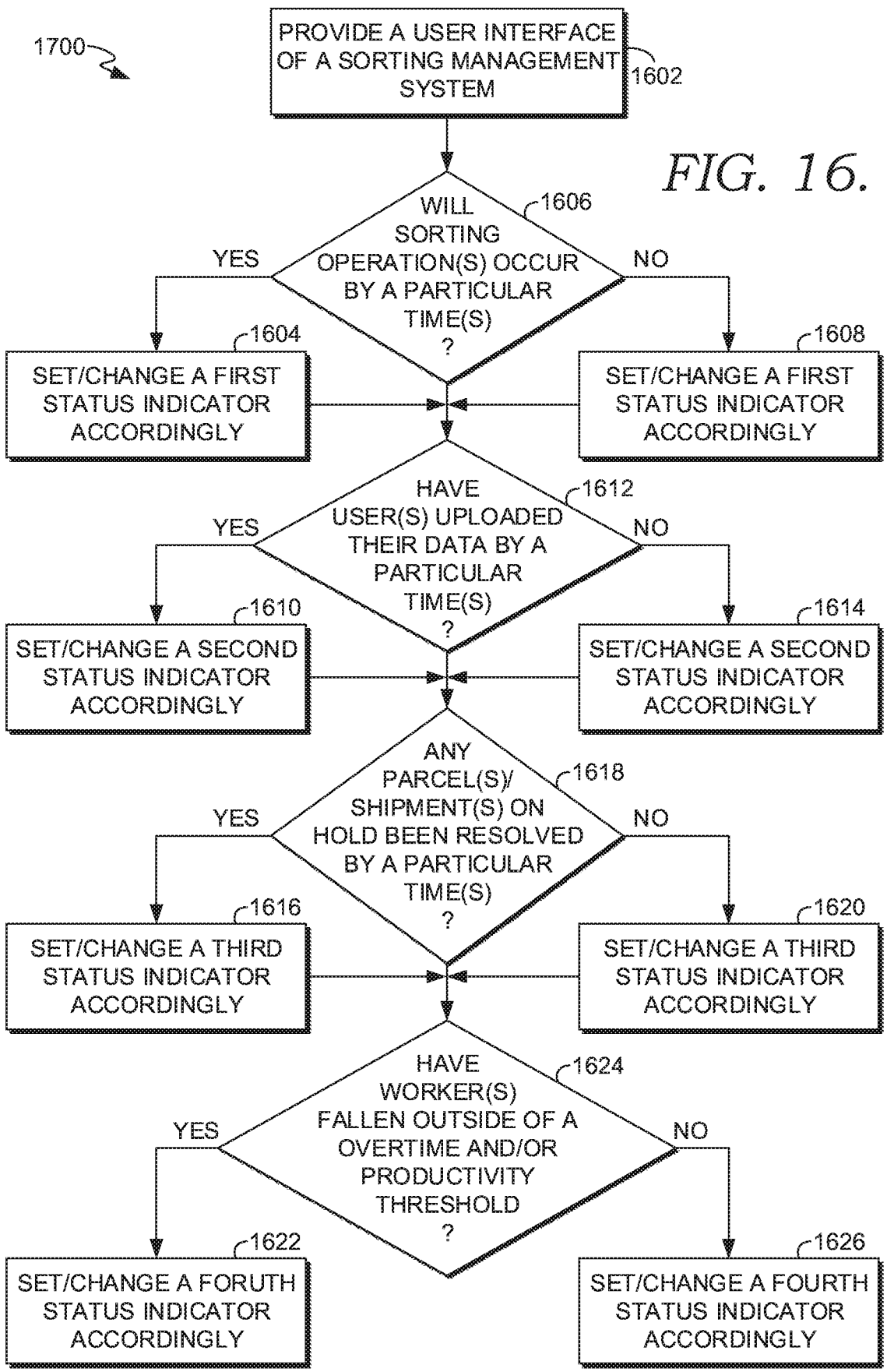

FIG. 16 is an example flow diagram illustrating how various status indicators can be set or changed, according to certain embodiments herein.

DETAILED DESCRIPTION

Various embodiments of the present disclosure will be described more fully hereinafter with reference to the accompanying drawings in which some, but not all embodiments are shown. Indeed, these embodiments may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. COMPUTER PROGRAM PRODUCTS, METHODS, AND COMPUTING ENTITIES

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. However, embodiments of the present disclosure may also take the form of an entirely hardware embodiment performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXEMPLARY SYSTEM ARCHITECTURE

FIG. 1 provides an illustration of a system that can be used in conjunction with various embodiments of the present disclosure. As shown in FIG. 1, the system may include one or more vehicles 100, one or more mobile computing entities 105, one or more central computing entities 110, one or more Global Positioning System (GPS) satellites 115, one or more location sensors 120, one or more telematics sensors 125, one or more information/data collection devices 130, one or more networks 135, one or more user computing entities (not shown), and/or the like. Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), or the like. Additionally, while FIG. 1 illustrates certain system entities as separate, standalone entities, the various embodiments are not limited to this particular architecture.

a. Exemplary Vehicle

In various embodiments, the term vehicle 100 is used generically. For example, a vehicle 100 may be a manned or an unmanned terrestrial, aerial, or nautical vehicle—such as a tractor, truck, car, motorcycle, moped, Segway, bicycle, golf cart, hand truck, cart, trailer, tractor and trailer combination, van, flatbed truck, vehicle, drone, airplane, helicopter, boat, barge, and/or any other form of object for moving or transporting people and/or items (e.g., one or more packages, parcels, bags, containers, loads, crates, items banded together, vehicle parts, pallets, drums, the like, and/or similar words used herein interchangeably). In one embodiment, each vehicle 100 may be associated with a unique vehicle identifier (such as a vehicle ID) that uniquely identifies the vehicle 100. The unique vehicle ID (e.g., trailer ID, tractor ID, vehicle ID, and/or the like) may include characters, such as numbers, letters, symbols, and/or the like. For example, an alphanumeric vehicle ID (e.g., "AS445") may be associated with each vehicle 100. In another embodiment, the unique vehicle ID may be the license plate, registration number, or other identifying information/data assigned to the vehicle 100.

FIG. 1 shows one or more computing entities, devices, and/or similar words used herein interchangeably that are associated with the vehicle 100, such as an information/data collection device 130 or other computing entities. In general, the terms computing entity, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, wearable items/devices, items/devices, vehicles, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. FIG. 2 provides a block diagram of an exemplary information/data collection device 130 that may be attached, affixed, disposed upon, integrated into, or part of a vehicle 100. The information/data collection device 130 may collect telematics information/data (including location data) and transmit/send the information/data to the mobile computing entity 105, the central computing entity 110, and/or various other computing entities via one of several communication methods.

Referring to FIG. 2, the information/data collection device 130 may include, be associated with, or be in wired or wireless communication with one or more processors 200 (various exemplary processors are described in greater detail below), one or more location-determining devices or one or more location sensors 120 (e.g., Global Navigation Satellite System (GNSS) sensors), one or more telematics sensors 125, one or more real-time clocks 215, a J-Bus protocol architecture, one or more electronic control modules (ECM) 245, one or more communication ports 230 for receiving telematics information/data from various sensors (e.g., via a CAN-bus), one or more communication ports 205 for transmitting/sending data, one or more RFID tags/sensors 250, one or more power sources 220, one or more information/data radios 235 for communication with a variety of communication networks, one or more memory modules 210, and one or more programmable logic controllers (PLC) 225. It should be noted that many of these components may be located in the vehicle 100 but external to the information/data collection device 130.

In one embodiment, the one or more location sensors 120, modules, or similar words used herein interchangeably may be one of several components in wired or wireless communication with or available to the information/data collection device 130. Moreover, the one or more location sensors 120 may be compatible with GPS satellites 115, such as Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, triangulation may be used in connection with a device associated with a particular vehicle and/or the vehicle's operator and with various communication points (e.g., cellular towers or Wi-Fi access points) positioned at various locations throughout a geographic area to monitor the location of the vehicle 100 and/or its operator. The one or more location sensors 120 may be used to receive latitude, longitude, altitude, heading or direction, geocode, course, position, time, and/or speed information/data (e.g., referred to herein as telematics information/data and further described herein below). The one or more location sensors 120 may also communicate with the central computing entity 110, the information/data collection device 130, mobile computing entity 105, and/or similar computing entities.

As indicated, in addition to the one or more location sensors 120, the information/data collection device 130 may include and/or be associated with one or more telematics sensors 125, modules, and/or similar words used herein interchangeably. For example, the telematics sensors 125 may include vehicle sensors, such as engine, fuel, odometer, hubometer, tire pressure, location, weight, emissions, door, and speed sensors. The telematics information/data may include, but is not limited to, speed data, emissions data, RPM data, tire pressure data, oil pressure data, seat belt usage data, distance data, fuel data, idle data, and/or the like (e.g., referred to herein as telematics data). The telematics sensors 125 may include environmental sensors, such as air quality sensors, temperature sensors, and/or the like. Thus, the telematics information/data may also include carbon monoxide (CO), nitrogen oxides (NOx), sulfur oxides (SOx), Ethylene Oxide (EtO), ozone ($O_3$), hydrogen sulfide ($H_2S$) and/or ammonium ($NH_4$) data, and/or meteorological information/data (e.g., referred to herein as telematics data).

In one embodiment, the ECM 245 may be one of several components in communication with and/or available to the information/data collection device 130. The ECM 245, which may be a scalable and subservient device to the information/data collection device 130, may have information/data processing capability to decode and store analog and digital inputs from vehicle systems and sensors. The ECM 245 may further have information/data processing capability to collect and present telematics information/data to the J-Bus (which may allow transmission to the information/data collection device 130), and output standard vehicle diagnostic codes when received from a vehicle's J-Bus-compatible on-board controllers 240 and/or sensors.

As indicated, a communication port 230 may be one of several components available in the information/data collection device 130 (or be in or as a separate computing entity). Embodiments of the communication port 230 may include an Infrared information/data Association (IrDA) communication port, an information/data radio, and/or a serial port. The communication port 230 may receive instructions for the information/data collection device 130. These instructions may be specific to the vehicle 100 in which the information/data collection device 130 is installed, specific to the geographic area in which the vehicle 100 will be traveling, specific to the function the vehicle 100 serves within a fleet, and/or the like. In one embodiment, the information/data radio 235 may be configured to communicate with a wireless wide area network (WWAN), wireless local area network (WLAN), wireless personal area network (WPAN), or any combination thereof. For example, the information/data radio 235 may communicate via various wireless protocols, such as 802.11, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth protocols (including Bluetooth low energy (BLE)), wireless universal serial bus (USB) protocols, and/or any other wireless protocol.

b. Exemplary Central Computing Entity

FIG. 3 provides a schematic of a central computing entity 110 according to one embodiment of the present disclosure. In general, the terms computing entity, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, RFID tags, ear pieces, scanners, televisions, dongles, cameras, wristbands, wearable items/devices, items/devices, vehicles, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the central computing entity 110 may also include one or more communications interfaces 320 for communicating with various computing entities, such as by communicating data, content, information, and/or similar terms used herein interchangeably that can be transmitted, received, operated on, processed, displayed, stored, and/or the like. For instance, the central computing entity 110 may communicate with vehicles 100, mobile computing entities 105, and/or the like.

As shown in FIG. 3, in one embodiment, the central computing entity 110 may include or be in communication with one or more processing elements 305 (also referred to as processors, processing circuitry, and/or similar terms used herein interchangeably) that communicate with other elements within the central computing entity 110 via a bus, for example. As will be understood, the processing element 305 may be embodied in a number of different ways. For example, the processing element 305 may be embodied as one or more complex programmable logic devices (CPLDs), microprocessors, multi-core processors, coprocessing entities, application-specific instruction-set processors (ASIPs), and/or controllers. Further, the processing element 305 may be embodied as one or more other processing devices or circuitry. The term circuitry may refer to an entirely hardware embodiment or a combination of hardware and computer program products. Thus, the processing element 305 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 305 may be configured for a particular use or configured to execute instructions stored in volatile or non-volatile media or otherwise accessible to the processing element 305. As such, whether configured by hardware or computer program products, or by a combination thereof, the processing element 305 may be capable of performing steps or operations according to embodiments of the present disclosure when configured accordingly.

In one embodiment, the central computing entity 110 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 310 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

In one embodiment, the central computing entity 110 may further include or be in communication with volatile media (also referred to as volatile storage, memory, memory storage, memory circuitry and/or similar terms used herein interchangeably). In one embodiment, the volatile storage or memory may also include one or more volatile storage or memory media 315 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 305. Thus, the databases, database instances, database management system entities, data, applications, programs, program modules, scripts, source code, object code, byte code, compiled code, interpreted code, machine code, executable instructions, and/or the like may be used to control certain aspects of the operation of the central computing entity 110 with the assistance of the processing element 305 and operating system.

As indicated, in one embodiment, the central computing entity 110 may also include one or more communications interfaces 320 for communicating with various computing entities, such as by communicating data, content, information, and/or similar terms used herein interchangeably that can be transmitted, received, operated on, processed, displayed, stored, and/or the like. For instance, the central computing entity 110 may communicate with computing entities or communication interfaces of the vehicle 100, mobile computing entities 105, and/or the like.

Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the central computing entity 110 may be configured to communicate via wireless external communication networks using any of a variety of protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol. Although not shown, the central computing entity 110 may include or be in communication with one or more input elements, such as a keyboard input, a mouse input, a touch screen/display input, audio input, pointing device input, joystick input, keypad input, and/or the like. The central computing entity 110 may also include or be in communication with one or more output elements (not shown), such as audio output, video output, screen/display output, motion output, movement output, and/or the like.

As will be appreciated, one or more of the central computing entity's 110 components may be located remotely from other central computing entity 110 components, such as in a distributed system. Furthermore, one or more of the components may be combined and additional components performing functions described herein may be included in the central computing entity 110. Thus, the central computing entity 110 can be adapted to accommodate a variety of needs and circumstances.

c. Exemplary Mobile Computing Entity

FIG. 4 provides an illustrative schematic representative of a mobile computing entity 105 that can be used in conjunction with embodiments of the present disclosure. In one embodiment, the mobile computing entities 105 may include one or more components that are functionally similar to those of the central computing entity 110 and/or as described below. As will be recognized, mobile computing entities 105 can be operated by various parties, including operators of vehicles 100. As shown in FIG. 4, a mobile computing entity 105 can include an antenna 412, a transmitter 404 (e.g., radio), a receiver 406 (e.g., radio), and a processing element 408 that provides signals to and receives signals from the transmitter 404 and receiver 406, respectively.

The signals provided to and received from the transmitter 404 and the receiver 406, respectively, may include signaling information/data in accordance with an air interface standard of applicable wireless systems to communicate with various entities, such as vehicles 100, central computing entities 110, and/or the like. In this regard, the mobile computing entity 105 may be capable of operating with one or more air interface standards, communication protocols, modulation types, and access types. More particularly, the mobile computing entity 105 may operate in accordance with any of a number of wireless communication standards and protocols. In a particular embodiment, the mobile computing entity 105 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile computing entity 105 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The mobile computing entity 105 can also download changes, add-ons, and updates, for instance, to its firmware, software (e.g., including executable instructions, applications, program modules), and operating system.

According to one embodiment, the mobile computing entity 105 may include location determining aspects, devices, modules, functionalities, and/or similar words used herein interchangeably. For example, the mobile computing entity 105 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the mobile computing entity's 105 position in connection with a variety of other systems, including cellular towers, Wi-Fi access points, and/or the like. Similarly, the mobile computing entity 105 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The mobile computing entity 105 may also comprise a user interface (that can include a display 416 coupled to a processing element 408) and/or a user input interface (coupled to a processing element 408). For example, the user interface may be an application, browser, user interface, dashboard, webpage, and/or similar words used herein interchangeably executing on and/or accessible via the mobile computing entity 105 to interact with and/or cause display of information. The user input interface can comprise any of a number of devices allowing the mobile computing entity 105 to receive data, such as a keypad 418 (hard or soft), a touch display, voice/speech or motion interfaces, scanners, readers, or other input device. In embodiments including a keypad 418, the keypad 418 can include (or cause display of) the conventional numeric (0-9) and related keys (#, *), and other keys used for operating the mobile computing entity 105 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the mobile computing entity can collect contextual information/data as part of the telematics data.

The mobile computing entity 105 can also include volatile storage or memory 422 and/or non-volatile storage or memory 424, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the mobile computing entity 105.

d. Exemplary User Computing Entity

In one embodiment, a user computing entity may each include one or more components that are functionally similar to those of the central computing entity 110 and/or the mobile computing entity 105. For example, in one embodiment, each of the user computing entities may include: (1) a processing element that communicates with other elements via a system interface or bus; (2) a user interface; (3) transitory and non-transitory memory; and (4) a communications interface. As previously noted, the user computing entity may comprise a user interface. For example, the user interface may be an application, browser, user interface, dashboard, webpage, and/or similar words used herein interchangeably executing on and/or accessible via the user computing entity to interact with and/or cause display of information/data from the central computing entity 110 and/or the mobile computing entity 105, as described herein. These architectures are provided for exemplary purposes only and are not limiting to the various embodiments.

e. Exemplary Sorting Management System

Existing user interface and software technologies for sorting and managing parcels are static in that they provide non-intuitive or complicated user interfaces for navigation, provide limited views of important information, and provide non-real-time access to relevant data. For example, particular existing user interface technologies include main menus or home screens that fail to clearly indicate what sorting data is available and how to obtain more information concerning the data. Certain existing user interface technologies also require users to drill down several layers to obtain relevant information. This may make it arduous and slower for a user to navigate through the user interface to obtain relevant information. Consequently, using these interfaces may be costly for users who oversee sorting processes that are associated with important deadlines. Further, some user interfaces have limited views of information regarding one or more sorting process, such as only including fields that passively track whether a parcel/shipment has met a time deadline and/or how many parcels/shipments have occurred. However, other views or data may be relevant in managing one or more sorting operations. In another example, typical user interfaces and software technologies may indicate that shipment date targets have been missed without any indication or determination that one or more shipment date targets will be missed in the future or why the one or more shipment date targets were missed. When a problem arises with one or more sorting processes, such as when a set of workers have fallen below a productivity threshold, this can affect when these sorting tasks and shipment processes finish. However, some existing technologies fail to provide real-time monitoring indicating an important event has occurred, such as one or more workers falling below a productivity threshold.

At least some embodiments of the present disclosure therefore improve these existing user interface and other software technologies and the efficiency of using electronic devices by at least providing an intuitive and navigable user interface with various views that include one or more unique status indicators. These status indicators can indicate whether one or more sorting operations have or will occur outside of a particular time, such as a target deadline. The status indicators can further indicate whether one or more users have uploaded shipping data by a particular time. These status indicators can also indicate whether one or more parcels or shipments have been on hold past a threshold quantity of time. Further, these status indicators can indicate whether one or more works have fallen below a productivity threshold or have gone into an overtime period.

In an example illustration of some technological improvements over existing user interfaces, some embodiments of the present disclosure include a home screen or main menu that is intuitive and easily navigable in that it provides clear identifiers that make it apparent what information can be accessed and by whom. This may increase a user's navigation speed, such as a supervisor who needs to quickly view one or more status indicators to determine whether one or more sorting processes will meet a target date. For example, FIGS. 5A and 5B make it clear who or what worker role should be accessing what information (e.g., "Supervisor Tools" and "Administration" of FIGS. 5A and 5B). Some embodiments of the present disclosure also increase user navigation speed by allowing data to be accessed directly from the main menu, such as the "supervisor tools" information and/or the "OPStatus Monitor" information, as opposed to drilling down several layers before important information is obtained.

Some embodiments of the present disclosure also improve existing user interface technologies by including additional views of important information, such as some or all of the views as described in 5A through 15. Certain embodiments of the present disclosure also improve existing user interface and software technologies by providing real-time or near-real-time access to important information. For example, when a problem arises with one or more sorting processes, such as when a set of workers have fallen below a productivity threshold, this can affect when these sorting tasks and shipment processes finish. Accordingly, some embodiments of the present disclosure provide real-time monitoring indicating an important event has occurred via one or more status indicators, and in response to the detection of such event, it can be projected or predicted whether a target deadline will be met. Certain embodiments also describe why one or more events have occurred, such as identifying that the productivity of a particular quantity of workers is causing a status indicator to indicate that a target deadline will be missed.

Parcels (i.e., packages, containers, letters, or the like) may undergo various sorting processes as the parcel is moved from an origin to a destination as part of a shipping process. For example, between the origin and the destination, a parcel may be shipped to one or more intermediate facilities where the parcel may be processed and sorted before being shipped to its final destination. In some shipping processes, such as those involving international shipments, parcels may undergo an origin data capture (ODC) process, in which parcels are sorted and information/data associated with the parcels may be captured and/or verified to meet customs requirements. Various systems and tools may be utilized to monitor the progress of an ODC sorting process. In some embodiments, a sorting management system may monitor the progress of a sorting process, the sorting management system including a user interface, such as the display 416 of the mobile computing entity 105 as described above.

Referring to FIGS. 5A and 5B, a home screen (also known as a "landing page" or "main menu") user interface is schematically depicted. The sorting management system provides various modules for display via the user interface, including an OPStats module, a supervisor tools module, an administration tools module, and an international tools module. The home screen 5A and/or 5B can be provided in any suitable manner. For example, in some embodiments, a user can open a client application, such as a web browser, and input a particular Uniform Resource Locator (URL) corresponding to a particular website or portal. In response to receiving the user's URL request, an entity, such as the central computing entity 110 may provide or cause to be displayed to a user device (e.g., a mobile computing entity 105), the home screen represented by FIG. 5A. A "portal" as described herein in some embodiments includes a feature to prompt authentication and/or authorization information (e.g., a username and/or passphrase) such that only particular users (e.g., a corporate group entity) are allowed access to information. A portal can also include user member settings and/or permissions and interactive functionality with other user members of the portal, such as instant chat. In some embodiments a portal is not necessary to provide the user interface, but rather the home screen 5A and 5B can be provided via a public website such that no login is required (e.g., authentication and/or authorization information) and anyone can view the information. In yet other embodiments, the home screen 5A and 5B represent an aspect of a locally stored application, such that a computing device hosts the entire application and consequently the computing device does not have to communicate with other devices (e.g., the central computing entity 110) to retrieve data.

The user interface is configured to receive an input from a user, and in response to receipt of the input, provide access to any of the OPStats module, the supervisor tools module, the administration tools module, and the international tools module. For example, the user can use a hand gesture, and/or an interface pointer to click (or hover over) a character set or identifier (e.g., OPStats Monitor) to obtain more information concerning the identifier. In some embodiments, the user can click on or otherwise select the plus sign button 501-1. In response to this action, a drop-down menu is displayed, as illustrated in FIG. 5B. The drop-down menu includes links to a "dashboard," "employee management" and "sort management" modules. If a user selects the minus sign button 501-3, the drop-down menu collapses, such that a screen analogous to FIG. 5A will be displayed. Some or each of these identifiers (e.g., "Supervisor Tools") will be described in more detail below. It is understood that although a collapsible drop down menu is depicted in FIG. 5B to drill down to various other sets of information the collapsible drop down menu or other intermediate functions need not exist to obtain relevant information. For example, in some embodiments, some or each of the views as described in FIGS. 6-15 are directly accessible from the home screen 5A. In an illustrative example, a user may hover over with a pointer the "supervisor tools" identifier (without clicking) and in response to the hovering, the "dashboard" data or view 600 may be displayed as a pop-up display in order for a user, such as a supervisor, to quickly view the status indicators (e.g., status indicator 612) to determine if there are any sorting operation issues. In this way, user navigation speed can be increased via this user interface without having to navigate through several screens or layers.

The terms first (e.g., first view), second (e.g., second view), third, etc. are not to be construed as denoting or implying order, time sequences, or any specific component makeup unless expressly indicated otherwise. Rather, they are to be construed as distinguishing two or more elements. For example, a first view, second view, third view, etc. may distinguish each of the views as represented in FIGS. 5A through 16.

The home screens 5A and 5B include clear and intuitive identifiers indicating who or what role type can access the data. For example, the "supervisor tools" identifier makes it apparent that this information is for supervisors or those in a supervising role to track. The "administration" identifier makes it apparent that administration staff can use this feature. The "int'l tools" identifier makes it apparent that the data corresponds to one or more international shipping facilities, as opposed to domestic facilities. The "OPStats monitor" feature makes it apparent that various statistics associated with sorting operations can be viewed. These clear indications may make it easier and faster for users to navigate through the user interface. For example, a domestic supervisor can quickly locate the "supervisor tools" identifier and view important status indicators (e.g., status indicator 612) to see if one or more processes associated with one or more sorting operations are going to plan, as opposed to navigating through a user interface organized by information or statistic type without regard to role, which is common in some existing user interfaces.

Although the home screen 5A and 5B is depicted as a graphical user interface (GUI), it is understood that instead of or in addition to a GUI, other user interface types can be utilized to organize and present particular information. For example, in some embodiments, the information, such as the identifiers illustrated in the home screen 5A and 5B, can be provided via auditory means, such through a smart speaker (e.g., GOOGLE HOME made by Alphabet, Inc. of Mountain View Calif.). Accordingly, a user can use his or her natural language as input (e.g., state "Supervisor Tools") to select a particular identifier or other information associated with the identifier such that in response to the user's natural language, an output auditory response is generated (e.g., "Dashboard" information).

Referring to FIG. 6, a user interface view 600 of a "supervisor tools" module is schematically depicted. In some embodiments, in response to the user selecting the "Dashboard" identifier in FIG. 5B, the interface view 600 is displayed (e.g., to the display 416 of the mobile computing entity 105). In some embodiments, a "dashboard" in the context of the present disclosure is a real-time or near real-time user interface tool that assists users in managing sorting operations to help reduce cost and/or improve service associated with the sorting operations. This is in contrast to typical static user interfaces or documents that merely provide non-real time statistics associated with sorting operations. For example, supervisors can ascertain areas of their operations that may require attention at a particular point in time based on one or more of the status indicators 608 and/or 612. A "status indicator" as described herein includes one or more symbols (e.g., an icon), identifiers, and/or flags that indicates whether user attention is needed for a particular set of information and/or whether data associated with one or more sorting processes have fallen outside of some threshold. For example, the status indicator 608 is depicted as a triangle with an exclamation point in the middle of the triangle. The status indicator 610 is depicted as a checkmark. The status indicator 612 is indicated as an "X". It is understood that although the status indicators are depicted as specific symbols, any symbol or identifier may be used, such as a string, one or more real numbers, one or more emoticons, and/or any alphanumeric text.

The status indicator 610 as represented by a checkmark (and/or a particular color such as green) may indicate that there are no current pending issues with an identifier, such as "service status" information. Using an illustrative example, one or more sorting operations can be predicted to be on time according to a target deadline and no deadlines may have passed and thus the status indicator 610 may be displayed. The status indicator 612, shown by an X (and/or a particular color such as red) may indicate that an identifier, such as "Workforce Status" requires immediate attention. For example, if a target date deadline has already passed and one or more sorting operations have still not occurred, the status indicator 612 may be displayed. Further, the status indicator 608 and associated indicators (and/or a particular color, such as yellow) may indicate that an identifier, such as "Sort Status" or "Volume Status" requires non-immediate supervisor or other user review. For example, if it is predicted that a certain sorting operation will not occur by a certain date but that date has not yet passed, then the status indicator 608 may be displayed. Although the status indicators are illustrated as corresponding to particular identifiers, it is understood that in various embodiments, each of the identifiers can be associated with some or each type of status indicator at different times. For example, at a first time, the "Sort Status" identifier can be associated with the status identifier 608. At a second time, the "Sort Status" identifier can be associated with the status identifier 610. At a third time, the "Sort Status" identifier can be associated with the status identifier 612. The status identifier can change dependent on the real-time information received. In order to view the particular problem associated with one or more identifiers as illustrated by the status indicators, a user can drill down by selecting or hovering over the identifier (e.g., "Volume Status") to see a popup window.

In embodiments, the mobile computing entity 105 may be in communication with the central computing entity 110 and may send and receive data/information related to the sorting process and the mobile computing entity 105 may provide or communicate various status indicators related to the sorting process. In the embodiments depicted in FIG. 6, the supervisor tools module may provide a display of a "sort status" associated with a sort status module, a "volume status" associated with a volume status module, a "service status" associated with a service status module, and a "workforce status" associated with a workforce status module. The view 600 also includes a ribbon 602 labeled "OPS manager," a refresh button 606, and a color modification button 604. The color modification button 604 and/or any other color modification depicted herein is configured to display, in response to a user selection of the button 604, a plurality of color options such that a user can select one or more colors to be implemented within one or more elements of the view 606. For example, a user may select a particular color and responsively, the color can be displayed to the ribbon 602, one of the status indicators, and/or any of the rows associated with the identifiers. In some instances, a user may select a particular color to distinguish views or widgets from one another. For example, in some embodiments, the view 600 represents a single widget that is displayed to a single screen along with several other widgets (e.g., as depicted in FIG. 15). Accordingly, a user may select the color modification button 605 for each widget to change the ribbon color of at least some of the widgets. For example, in some cases, a first set of widgets may be categorically related. Accordingly, a user may select a first color to each widget within the category to illustrate that the first set of widgets belong to the same first category. Likewise, a second set of widgets may be categorically related. Thus, a user may select a second color for each widget within the particular category to illustrate the second set of widgets belongs to the same second category, which may be different than the first category. In this way, users, such as supervisors can easily track information by the category.

A user can select the refresh button 606 or any other refresh button depicted herein in order to refresh data, such as statistics and/or status indicators. Because data can be updated in near real-time, this button 606 may be selected at any point in time to receive the most up-to-date information. In some embodiments, instead of or in addition to the refresh button 606, data may be updated as a background task and the views may accordingly be automated. Therefore, in some cases, a user need not select an updating feature, such as the refresh button 606 to view updates. Rather, the system can automatically update particular views of information without user interaction.

The "sort status" identifier illustrated in FIG. 6 may provide a status indication indicative of whether a sorting process will be finished within or by a predefined period of time (e.g., a "target" date), such as a standard working shift of a worker or set of workers. A "target" date, time, deadline, or period as disclosed herein refers to one or more times (e.g., clock times, such as 4 p.m.), dates, and/or time ranges that one or more events (e.g., shipping operations) should occur by or within. These target times may be set by one or more users, such as supervisors and/or one or more automated processes that set rules. In some embodiments, the mobile computing entity 105 may receive information/data from the central computing entity 110 indicating the number of parcels to be sorted during a sorting activity, as well as current productivity levels and staffing of the sorting activity, which may be used to calculate an estimated finish time of the sorting activity, which is described in more detail below. The sort status may instead of or in addition provide a status indication of estimated overtime necessary to complete the sorting activity. Accordingly, if the estimated finish time is predicted to occur outside of an expected threshold or target time, the status indicator 612 may be displayed next to the "sort status" identifier indicating that immediate attention is needed. For example, a supervisor may drill down to see that several workers have taken vacation and that a particular sorting task will likely not occur by a target date. Consequently, the supervisor may then contact other people, such as contract workers or other employees to help meet the target deadline. Alternatively, for example, the status indicator 610 may be displayed next to the "sort status" indicator indicating that a sorting process will be finished within the predefined time period such that no additional supervisor actions need to occur. In some embodiments, the system (e.g., the central computing entity 110) compares historical sort rates at projected or predicted staffing levels against projected volume or quantity of shipments/packages in order to predict whether sorting requirements will be met and/or whether a target deadline will be met.

The "volume status" indicator provides a status indication indicative of whether consignors (e.g., shippers) have uploaded information/data, such as package level detail (PLD) information/data, associated with parcels involved in the sorting activity by a particular time. PLD information can include one or more of: name of consignee/consignor, date, address of consignor/consignee, product name associated with the package, quantity of the product, etc. For example, in some shipping processes, a consignor may upload information/data associated with a parcel or parcels to the central computing entity 110, and in some international shipments, the information/data associated with the parcels may be verified prior to shipping the parcel to a destination. For some consignors that ship multiple parcels, such as retailers or the like, information/data associated with parcels to be shipped on a particular day may be regularly uploaded to the central computing entity 110 by a predefined time or within a predefined time period. For example, a particular consignor may regularly ship parcels from an origin location and may upload parcel information/data for parcels shipped by 1:00 PM on the day of shipment. The volume status indicator may provide an indication if the information/data associated with parcels involved in the sorting process are and/or are not uploaded by a predefined time associated with the specific consignors. In this way, the volume status indication may assist in identifying potential issues consignors may have in uploading data/information and may assist in efficiently associating appropriate data/information with parcels involved in a sorting process. In some embodiments, if it is predicted or determined that the consignor will not upload the data by a particular time, then the status indicators 612 and/or 608 may be displayed next to the volume status indicator depending on how close a date approaches the particular time. Alternatively, if the consignor has or is predicted to upload the data within a particular time, the status indicator 610 may be displayed next to the volume status indicator.

The "service status" identifier may provide a status indication indicative of parcels on hold that have not been resolved within a particular time, and/or parcels that are outbound to a final destination without having been processed completely. For example, in a sorting activity, some parcels may be subject to a hold or may progress through the sorting process without having been processed completely, such as when there is incomplete data/information associated with the parcel that prevents the parcel from being fully processed. By providing a status indication indicative of the parcels on hold that have not been resolved within a predefined time as well as parcels that have not been completely processed, the service status indication may assist in identifying parcels that may require further attention during a sorting process. In an example illustration, if a parcel is on hold and the target time has passed, the status indicator 612 may be displayed next to the service status indicator.

The "workforce status" identifier may provide a status indication related to employee productivity, such as an indication of employees that are in overtime (OT), employees operating below a predetermined productivity target, and/or an indication if there is enough work to occupy employees that are dedicated to ODC activity. In some embodiments, when an employee is within or predicted to be within a particular time period (e.g., 15 minutes) of going into overtime, the status indicator 608 may be displayed. In some embodiments, when an employee is already in overtime hours, the status indicator 612 may be provided. In some embodiments, when an employee is producing at a first level below an expected threshold of a productivity target (e.g., 10% below target), the status indicator 608 may be displayed. In some embodiments, when an employee is producing at a second level below an expected threshold of a productivity target (e.g., 20% below the target), the status indicator 612 may be provided.

It is understood that although the view 600 and the views corresponding to FIGS. 7-15 illustrates specific values (e.g., "15 minutes over"), other values may instead of or in addition be displayed. Accordingly, the particular values within the views are representative only. For example, the view 800 of FIG. 8 at a second time may display the status indicator 610 illustrating that a current projection time is "on time."

Referring to FIG. 7, a sort volume view 700 of the sort status module, as may be accessed from a sorting management system user interface, is schematically depicted. In some embodiments, the view 700 is displayed in response to a selection of the "sort status" identifier of FIG. 6 and/or the "sort management" identifier of FIG. 5B. The view 700 displays data related to packages and shipments of a sort activity of an ODC process. The sort status module may retrieve the data from the central computing entity 110 and provide the sort volume for display via the mobile computing entity 105. For each sort activity, planned or predicted shipments/packages may be compared against actual shipments/packages processed during the sort activity to be able to determine whether a sorting process will occur by a given time. The "plan shipments" field as indicated in FIG. 7 corresponds to a planned quantity of shipments of one or more shipping parcels that will occur on a given date or within a date range. For example, the plan shipments field may indicate that particular parcels have already been received at an intermediate processing center for sorting and are associated with a shipment plan (e.g., have been barcoded or loaded) but have not completed a shipment action within an intermediate processing center and/or to a destination. In some embodiments, the "plan shipments" field instead of or additionally corresponds to shipments that are prepared by uploading shipping information to the central computing entity 110 (via the mobile device 105).

The "plan packages" field as indicated in FIG. 7 corresponds to a quantity of packages or other parcels that are currently being processed to ship for a given date or date range. For example, the plan packages field may indicate which packages or parcels have already been received at an intermediate processing center for sorting but have not shipped to a destination address yet. In some embodiments, the "plan packages" field instead of or in addition corresponds to package information that has been uploaded to the central computing entity 110 but has not completed a shipping action.

In some embodiments, the plan shipments and/or packages field includes quantities at which the sorting management system predicts will occur for the given date or date range, as described in more detail below. The "actual shipments" and "actual packages" fields correspond to the actual quantity of shipments or packages that have already been processed by a sorting location or have been shipped to a destination address.

The prediction of packages (e.g., "plan packages") that need to be shipped and/or the prediction of shipments (e.g., "plan shipments") that need to occur may be calculated via any suitable manner. For example, techniques such as neural networks (e.g., Word2vec), linear regression models, and/or Bayesian models can be implemented. In an illustrative example, the second row of the view 700 corresponding to a date #2 indicates that there are 813 actual shipments that have already been processed but 909 have been planned to occur for the date #2. The sorting management system (e.g., the central computing entity 110) may predict based at least in part on historical data (e.g., historical trends), such as a corresponding month and day of previous years. For example, date #2 may be associated with a particular month and day. Over several years, there may have been over 900 shipments on that particular month and day. Accordingly, the specific quantity 909 may be the mean, median, or other statistic associated with the previous year data. In some embodiments, instead of or in addition to the historical trends based on previous years, the prediction can be based on data obtained from other resources. For example, a service API, (e.g., a social media service or news service) may be queried in order to predict that an event (e.g., a natural disaster or worker strike) will occur at a particular date. Accordingly, it may predicted that a certain limited quantity of shipments and/or packages will occur for a particular date or date range. Therefore, the status indicator may accordingly be represented as the status indicators 608 and/or 612. Any suitable API may be queried, such as a consumer API server (e.g., a bank, an online retailer, etc.), a social media server, and/or any other suitable remote device or set of devices.

In some embodiments, the plan packages and/or shipments are utilized to generate a projected time that one or more sorting or completed shipping actions should occur. In these embodiments, a plurality of planned shipment and package quantities can be compared with a quantity of actual shipment and package quantities. For example, on the third row down in the view 700 corresponding to date #3, there are 1310 actual packages that have been shipped but only 1358 have been planned to be shipped. Because only 48 packages need to be shipped, it is projected that the 1358 quantity will be met in a relatively short amount of time (e.g., a couple of days). In certain embodiments, the plan packages and/or shipments are utilized to determine whether one or more sorting operations will occur during a target period. For example, if it is planned that on a particular day only 100 shipments will occur, it may be determined that in a regular work shift, the day's shipments will occur despite the fact that there may be various workers unable to work that day.

The show field 701 indicates how many entries or rows will be displayed within the sort volume view 700. Although the view 700 indicates that the quantity is set to 10, it is understood that any quantity of entries may be displayed to the view 700 (e.g., 1 or 100). In some embodiments, the specific quantity can be dependent on how many dates a user wants to receive information about.

In some embodiments, receiving the "plan" shipments and/or packages information is based at least in part on telematics sensor data, as obtained by the telematics sensors 125 of FIG. 1. For example, based on the historical speed, miles driven, and/or fuel consumption for a given route of a vehicle, particular packages or shipments can be planned or predicted to occur. In some embodiments, the "actual" shipments and/or packages information is based at least in part on the central computing entity 110 retrieving information from the information collection devices 130 indicating that one or more packages and/or shipments have been made or shipped.

Referring to FIG. 8, another view 800 of the sort management module, is schematically depicted. In some embodiments, the view 800 is displayed in response to a selection of the "sort status" identifier of FIG. 6, the "sort management" identifier of FIG. 5B, and/or any set of information as discussed in FIG. 7. The view 800 indicates a projected finish time of a sort and/or shipping process, and may provide an indication if the projected finish time exceeds a target threshold time or deadline, such as a planned end of shift. In some embodiments, a planned end of shift or other time entry is set according to planned start times and down times as described in more detail of FIG. 14A. The view 800 specifically indicates that it is predicted or projected that a sorting process will go 15 minutes over a target time. Accordingly, the status indicator 612 is displayed.

The information displayed in the view 800 in various embodiments can be provided or determined based on the productivity of one or more workers, staffing details (e.g., staffing shortages), the remaining volume of shipments or packages that needs to occur, volume availability issues (e.g., a sorting machine may have broken), and/or volume trends (e.g., current and/or historical trends). The "productivity" of workers can be gauged in various manners, such as determining a quantity of hours a worker has worked for a particular time interval (e.g., a quantity of hours per day for over a year), how long the worker has worked at the company or in the shipping business at large, the quantity or average shipments/packages associated with a worker over a particular time interval, how many hours a worker goes into overtime, and/or a health issue associated with the worker. These and/or other factors may be utilized to assess how productive a worker is or will be for a given time period.

Staffing details may take into account staffing shortages. For example, a particular set of workers may be absent at a particular time period due to illness or other health issue, paternity/maternity leave, vacation or the like. The sorting management system may identify each worker that will be absent or active for a particular time period and predict whether a sorting or shipping process will still occur by a given target time. For example, the sorting management system may determine that half of a sorting team may be absent on a particular day. However, given that the remaining half of the sorting team is identified as being productive (e.g., because of the quantity of experience each member has) and/or the low quantity of shipments that need to occur for the day, it may still be predicted that the sorting or shipping process will still occur on time.

The remaining volume of shipments or packages that needs to occur may include comparing the planned shipments/packages versus the actual shipments packages. For example, referring back to FIG. 7, according to the fourth entry or row in the view 700, it is indicated that there are 14 actual packages that have been shipped. However, for that first date there may be a planned 597 packages to ship. The sorting management system may subtract the actual packages from the planned packages to determine that there still needs to be 583 packages that need to be delivered. The sorting management system may additionally determine a current date to determine how many more days there is until the first date and determine whether a sorting process will occur based on the days remaining until the first date and the quantity of packages (or shipments) that still need to occur. In some embodiments, additional factors are utilized as described above to make this prediction, such as staffing shortages, staffing productivity, etc.

The prediction or projection of when/if a particular sorting/shipping action will occur before a particular time or target date (e.g., as illustrated in the view 800) may occur via any suitable technique, such as such as using neural networks (e.g., Word2vec), linear regression models, Bayesian models, and/or other machine learning techniques. Using machine learning techniques in some embodiments includes identifying historical patterns and associations (e.g., half of the workforce team is always absent December $20^{th}$ through the end of the year), and making a prediction or projection based on the identified historical patterns and associations (e.g., extra help will be needed December $20^{th}$ through the end of the year). In an illustrative example, Bayes' theorem may be utilized as:

$$P(A \mid B) = \frac{P(B \mid A)P(A)}{P(B)}, \quad \text{Equation 1}$$

where A and B are events and $P(B) \neq 0$. That is, the probability (P) of A given B=the probability of B given A multiplied by the probability of (A) all over the probability of B. For example, the probability of A given B, may correspond to the probability that a sorting project will finish by a target time (A) given: the current productivity of workers ($B_1$), the quantity of packages or shipments that still need to occur before a target date ($B_2$), the fact that X quantity of workers are not working ($B_3$), the fact that X quantity of workers are on paternity leave ($B_4$), the fact that a sorting machine is not working ($B_5$), historical and recent volume trends ($B_6$) and/or any other suitable factor. In another example, a word embedding vector model (e.g., Word2vec) may be utilized. In an illustrative example for determining volume trends, various vectors may be input in vector space within the vector model, such as various months corresponding to several years of data. The input of a particular month may be fed to the word embedding vector model and the closest vector to the particular month may be a particular quantity (e.g., average quantity) associated with particular shipments and/or packages that have historically occurred during that month over several time spans. Because the particular quantity is the closest vector according to the input, it may be determined that the current quantity is well short or meets this quantity and based on that a target deadline will or will not be made. In some embodiments, the particular quantity is displayed to the view 700 in one or more of the "plan package/shipment" fields. Each of these predictions may help a user, such as a supervisor, determine if additional help or changes are needed in order to complete particular sorting actions on time, such as hire outside help, ask workers to work overtime, etc.

The status indicators indicated in the view 800 or by the "sort status" identifier of FIG. 6 may be set according to any suitable set of rules. For example, in some embodiments a dashboard can turn yellow and/or the status indicator 608 may be displayed if it is projected that a sorting action or set of actions will occur between 15 minutes and 29 minutes later than a target deadline. The dashboard can turn red and/or the status indicator 612 may be displayed if it is projected that a sorting action or set of actions will occur 30 minutes or greater than the target deadline. The dashboard can turn green and/or the status indicator 610 may be displayed if it is projected that a sorting action or set of actions will occur 0-14 minutes later than the target deadline.

Referring to FIG. 9, a volume manager view 900 of the sorting management system user interface is illustrated. In some embodiments, the view 900 is provided or displayed in response to a user selection of the "volume status" identifier of FIG. 6. The view 900 provides for display, an indication that a consignor or shipper has not uploaded information/data associated with one or more parcels to the central server 110 by a target time. The volume status module may provide an indication of time elapsed from the target time (e.g., an indication of how late the consignor is in uploading the data/information). FIG. 9 specifically illustrates that a particular entity (8X352X) is 7.42 hours late uploading their data. This information or other analogous information may be provided so that a user (e.g., a supervisor) may contact shippers to remind them to upload their data. This information also allows users to plan for additional work if they are unable to contact the shipper(s) that have not uploaded their data.

In some embodiments, determining of how late an entity uploads their information is based on a median, average, or other patterned upload time or day that a particular entity has historically performed uploading of information. In some embodiments, the central server 110 can receive user input regarding when an upload should occur instead of or in addition to determining an upload pattern (e.g., average upload time) as described above. For example, the central server 110 can provide a field to a user of a mobile computing entity 105, which requests the user to input a particular day and/or time that a user usually uploads shipping information. The user can responsively input this information, which is then uploaded to the central server 110.

In an illustrative example of how the uploading and time monitoring can occur, at a first time a shipping user can utilize a mobile computing entity 105 to input parcel data, such as address information, identifiers of parcels to be shipped, etc. The input may be transmitted and uploaded to the central server 110. The central server 110 can then timestamp the upload. At a second time, the same shipping user can input data corresponding to another set of parcel data that is uploaded to the central server 110 and the data can be timestamped again. The first and second time may correspond to a particular patterned time or time period that a shipper usually uploads information (e.g., every Tuesday). Accordingly, at a third time, the central server 110 may identify that a particular shipper has not uploaded shipping information based on the timestamps associated with the first and second times. For example, the third time may match the exact day of the first and second times, except no upload has occurred. Therefore, a counter may be utilized after the third time has passed to indicate a quantity of time that has passed (e.g., minutes and/or hours).

The generating of the status indicators in FIG. 9 and/or the "volume status" of FIG. 6 may be based on any suitable set of rules. For example, in some embodiments, when the time has passed a point that a user usually uploads shipping data or has indicated it will upload shipping data, the status indicator 612 is displayed. In some embodiments, when a current time is approaching or is close to when a user usually uploads shipping data (e.g., 3 hours before the usual upload time), the status indicator 608 is provided. Further, when a current time is outside of a time window that is approaching when the user usually uploads shipping data (e.g., 2 days before), the status indicator 610 may be displayed.

FIG. 10 schematically depicts a service manager view 1000 of the sorting management system user interface, according to certain embodiments of the present disclosure. In some embodiments, the view 1000 or analogous views are displayed in response to a user selection of the "service status" identifier of FIG. 6. The service status module provides a status indication of shipments on hold that have not been resolved within a target time, or parcels that are outbound without having been processed completely. In some embodiments, associated parcels have already been scanned and loaded to an outbound load (e.g., vehicle container) in preparation for going to a destination but are still on hold or have not been processed.

The "item" field of the view 1000 indicates the code or reason why a particular parcel is on hold or has not been processed. The "EDC" code corresponds to parcels that are in suspense for any reason. If any parcels are in suspense, a user may determine if the corresponding parcel is available to process without retrieving the parcel from the load. The "OH" code corresponds to parcels that are on hold for any reason. A user can determine if one or more shipments or parcels should continue to be held or released. If the shipment/parcel should continue on hold, the user can retrieve the parcel/shipment and return it to a holding area. Otherwise, the hold can be released such that the shipment can continue to be processed. The "AES" and "CO" identifiers correspond to particular missing requirement verifications according to a region, such as required filings or other domestic or international shipping requirements. If any parcels are missing these requirements, a user may determine if the corresponding parcel is available to process without retrieving the parcel from the load.

The "package" field of the view 1000 indicates a tracking identifier for particular parcels. The "scan time" field of the view 1000 indicates a time at which particular parcels were scanned out (e.g., barcoded) in preparation to be loaded into a unit (e.g., a container and/or a vehicle). The "scan load" field indicates particular outbound load identifiers that particular parcels have been loaded into. In an example illustration of how each of these fields correspond, the first record or entry may be populated. The first entry indicates that for the particular package "IZ10R3576895453721," it is under "EDC" suspense, but was scanned at 3:19 p.m. and was loaded into the unit "UPST95045E" in preparation for shipment.

The status identifiers may be set according to any suitable set of rules for the view 1000 and/or the "service status" identifier indicated in FIG. 6. For example, in some embodiments, the status indicator 612 is provided when a shipment has been scanned outbound but has not been completely processed by a sorting operation. For example, if any of the codes displayed in FIG. 10 are associated with a parcel having a hold/suspense condition (e.g., EDC, OH), the status indicator 612 can be provided. Accordingly, a user can drill down to determine why the specific parcel has not been processed.

In some embodiments, the information in the view 1000 is used to help make the predictions of whether one or more sorting operations will occur by a target time, as described in FIG. 8. For example, parcels on hold can be discounted or not taken into account for completing one or more sorting operations by a given target time, since users, such as supervisors, may need to clear the hold before any continuation of a shipping process.

FIG. 11 schematically depicts a workforce manager view 1100 of the sorting management system user interface, according to certain embodiments of the present disclosure. In some embodiments, the view 1100 or an analogous view is displayed in response to a user selection of the "workforce status" identifier of FIG. 6. In some embodiments, workforce status corresponds to indicating whether employees are or about to go into an overtime and/or who have fallen below a productivity threshold. The productivity threshold may be or include any suitable production goal, such as requiring sorting X packages per day, working X quantity of hours per day, and/or minimizing errors to X quantity per month, etc. In some embodiments, the workforce status is or includes determining some or each of the worker productivity information described above, such as maternity/paternity leave, vacation, health issues, etc.

The "item" field of FIG. 11 describes the employee action being monitored, which in the case of FIG. 11 is whether an employee has gone into overtime (i.e., "Over 8") and employee productivity (i.e., "PPH"). As described above, however, other actions may be monitored, such as vacation, duration of breaks/lunches, etc. The view 1100 indicates that Jane Doe #1 has gone over her 8 hour shift, indicating she has already gone into overtime. Users may want to know if someone has gone or is going into overtime in order to make staffing adjustments (e.g., call another worker to complete a job) in order to avoid overtime expenses, which can be greater than regular time expenses. The view 1100 further indicates that Jane Doe #2 is getting ready to go into overtime, as she is 1 hour under the 8 hour threshold. The view 1100 further indicates that John Doe has fallen below a productivity threshold (e.g., 20 PPH) at 13 PPH. PPH in some embodiments corresponds to a real number score, such as an integer that can be weighted or set according to one or multiple factors. For example, if the productivity threshold is 20 PPH, the most important factor may be a quantity of shipments/parcels that a worker has sorted, which may be associated with threshold requirement of Y quantity of shipments/parcels that must occur. A worker may have doubled the threshold Y, which pushes the worker passed or near the productivity threshold of 20, even though the worker may not have fulfilled other factors taken into account (e.g., quantity of hours worked) to determine whether the 20 PPH has been met. This indicates that factors such as these can weighted higher than others.

The status indicators associated with FIG. 11 and/or the "workforce status" identifier of FIG. 6 can be set according to any suitable set of rules. For example, if an employee has already gone into overtime, such as Jane Doe #1, the status indicator 612 may be displayed. If an employee is within a particular time of going into overtime but has not yet gone into overtime (e.g., within 15 minutes of going into overtime), the status indicator 608 may be displayed. Otherwise, the status indicator 610 may be displayed. In another illustrative example, actual employee productivity can be compared against target productivity to determine the particular status indicators. For example, one or more employees may be identified and a status indicator may be set to 608 if the one or more employees are between 5-10% below a productivity target. In another example, one or more employees may be identified and a status indicator may be set to 612 if the one or more employees are between 11-20% below a productivity target.

In some embodiments, the information contained in the workforce status view 1100 (and/or the view 1200 of FIG. 12) is used instead of or in addition to the prediction operations described above in FIG. 8 and/or FIG. 10. For example, if various workers on a current shift are shown as not historically meeting productivity targets, it may be predicted or projected that one or more sorting actions will not occur by the end of the shift or target deadline. Accordingly, the status indicator 612 or 608 may be displayed to both the "sort status" and "workforce status" identifiers of FIG. 6. In another example, if a particular quantity of employees have reached a threshold level of overtime working hours in recent weeks, it may indicate that on a particular day or set of days one or more workers may not be as productive. Accordingly, it may be predicted that one or more sorting operations will not occur by a particular target date. Therefore, the status indicator 612 or 608 may be displayed to both the "sort status" and "workforce status" identifiers of FIG. 6.

FIG. 12 schematically depicts an employee management view 1200 of the sorting management system user interface, according to certain embodiments of the present disclosure. In some embodiments, the view 1200 is provided in response to a user selection of the "employee management" identifier under the "supervisor tools" identifier in FIG. 5B and/or a user selection of one or more features (e.g., particular "detail" values) of the view 1100 of FIG. 11. In some embodiments, the information in the view 1200 is utilized for determining whether a worker is working overtime or other productivity measures described above with reference to FIG. 11. For example, in order to determine whether a worker has gone into overtime for a particular day, the time card hours worked for that day as displayed to the view 1200 may be queried. The employee management module offers users the ability to keep track of hours worked, such as weekly in response to the selection of the button 1209. In some embodiments, users can keep track of daily hours worked in response to the selection of the button 1205. The ribbon 1203 indicates that a particular location has been selected ("MEADOWLANDS"). Accordingly, one or more different locations can be selected to obtain working information associated with a group of workers that work at the particular locations.

The search field 1211 in some embodiments, allows a user to input a particular employee and/or location name or other identifier so as to quickly locate information corresponding to the user input information. For example, a user can input a name of an employee and the sorting management system can responsively show how many hours that user is or has worked. The "Add user" button 1201 is configured to open, upon selection, an add user window (not shown), which includes various fields for data entry. In some embodiments, the fields include an employee ID field configured to receive employee ID input, a last name field configured to receive last name input, a first name field configured to receive first name information, an employment type field (e.g., full time employee) configured to receive input indicating whether the employee is a regular employee, contractor, part-time, etc. The window may further include a start time field indicating when the worker started working either for employment at an entity and/or for a particular day or other time period.

Referring to the view 1200, the "EMP ID/RACF" field indicates one or more employee ID characters to identify an employee. The "last name" and "first name" fields correspond to last and first names of individuals. The "GTS SLIC" field corresponds to a particular unit or division of employment that a set of individuals work in. The "active today" field corresponds to whether one or more workers are working on a particular day or time period (A) or whether a worker is inactive and unavailable for working (B). The "employment type" field corresponds to whether one or more workers are full time (F) or part time (P). The "previous hours" field corresponds to hours one or more workers have previously worked in other units or divisions. If those hours were entered, they can automatically be uploaded and combined (e.g., by the central computing entity 110) with hours in other units or divisions. The "ODC start time" field corresponds to when one or more users started or clocked in at work (e.g., for that week/day). The "ODC end time" field corresponds to when one or more users ended or clocked out at work (e.g., for that week/day). The "source" field corresponds to whether one or more workers are actual division employees or are instead borrowed or taken from other divisions or entities. The "action" field corresponds to giving a user an option to either edit worker information (e.g., fix last name) or delete information.

FIG. 13 schematically depicts an employee management view 1300 of the sorting management system user interface, according to certain embodiments of the present disclosure. In some embodiments, the view 1300 is provided or displayed in response to a user selection of the "weekly summary" button 1209 of FIG. 12. The view 1300 illustrates the total hours worked for some or all employees at a given site (e.g., MEADOWLANDS). The "keyed hours" field corresponds to how many hours were worked by non-division employees (i.e., workers that work for other divisions or companies). The "weekly hours finalized" field corresponds to whether each hour of each employee has been entered. If one or more employee selects an option to finalize hours, in some embodiments, those hours cannot be edited any longer. Hours may be finalized in order to be counted or summed, such as for the prediction operations described above.

FIG. 14A schematically depicts a sort management view 1400 of the sorting management system user interface, according to certain embodiments of the present disclosure. In some embodiments, the view 1400 is provided or displayed in response to a user selection of the "sort management" identifier under the "supervisor tools" identifier in FIG. 5B. The sort management module offers users the ability to track planned start and end times for particular sites. In some embodiments, the information provided to the view 1400 can be uploaded to one or more data structures associated with the "dashboard" identifier of FIG. 5B in order to determine a production rate and/or planned end times (i.e., down times) for daily sorts. This information can ultimately be used for the prediction of whether one or more sort actions will occur at or within some target deadline, as described above in FIG. 8. The "plan start time" field corresponds to when one or more sites or set of workers plan to start working on a particular day (e.g., 7 a.m.). The "plan down time" field corresponds to when one or more sites plan to stop working on the particular day (e.g., 3 p.m.). These time ranges can be considered a "work shift" as disclosed herein. In some embodiments the "plan down time" is or includes a target time or deadline as described herein. These work shift hours can be utilized, as described above, to determine whether one or more sites will finish one or more sorting actions at a target time. For example, given that a set of workers are deemed to be productive, and that only a small quantity of packages need to be processed (e.g., according to a plan shipment quantity as indicated in FIG. 7), and that a work shifts ends by 4 p.m., it may be determined that one or more sorting operations will occur by the end of the shift or target deadline. Accordingly, the status indicator 610 may be displayed next to the "sort status" identifier of FIG. 6.

FIG. 14B schematically depicts a sort management view of the sorting management system user interface, according to certain embodiments of the present disclosure. In some embodiments, the view of FIG. 14B is displayed or provided in response to a user selection of the edit button 1401 of FIG. 14A or analogous button dependent on what day of the week a user desires to generate an entry for. A user can enter the planned start and down times and click the "save" button. In response to the save button selection, the information can be displayed to the view 1400 of FIG. 1, such as in the "Mon" entry.

FIG. 15 schematically depicts a view 1600 of the sorting management system user interface, according to certain embodiments of the present disclosure. In some embodiments, the view 1600 is displayed or provided in response to a user selection of the "OPStats Monitor" identifier of FIGS. 5A and/or 5B. The OPStats monitor module may be configured to consolidate several widget views of several statistics to one page or view according to a particular location. The view 1600, for example, includes 8 widgets—1607, 1609, 1611, 1613, 1616, 1619, 1621, and 1623—each of which can be containing applications or windows that can be minimized, expanded, scrolled (e.g., via the scroll bar 1617), and/or changed according to color. The view 1600 further includes the ribbon 1601, which indicates a particular site ("SADDLEBROOK") the statistics are associated with. Accordingly, each widget may contain information that is particular to a specific site and may include different data dependent on which site is selected. The view 1600 further includes a calendar button 1603, which corresponds to what statistics are provided in the widgets depending on the date selected. The view 1600 further includes a submit button 1605, which can allow each of the information displayed to be saved and submitted. In some embodiments, the view 1600 includes a consolidation of some or each of the views of FIGS. 6-14B.

The widget 1623 "volume by shipper" in some embodiments corresponds to the volume or quantity of parcels and/or shipments that are being processed or have occurred with regard to specific shippers. As illustrated in the widget 1623, the list may be ordered according to the highest producing shippers. This information may be utilized to help with the predictions, as described above. For example, if the shipper "Nobel Biocare Proger" is no longer utilizing a shipping service, it can be determined (because of the high volume) that a planned or predicted amount of parcels will not be shipped and thus it may be more likely that one or more sorting actions will occur according to a target deadline.

The widget 1609 "EDC suspense totals" in some embodiments corresponds to the quantity of volume that has been uploaded by a shipper that needs to be removed from a suspense delay. The widget 1609 helps prevent non-origin processed volume by displaying the suspense volume that has bypassed one or more sorting operations but is still moving within a network. A drill down is available (e.g., via information available in the view 1000) to determine the suspense shipments and the reasons for the suspense, such as an EDC code identifier.

The widget 1611 "holds and releases" in some embodiments corresponds to volume currently on hold at an origin facility (e.g., a sorting facility), volume released by the origin facility on the current sort date, volume from the origin facility currently on hold at an export facility, and/or volume from the origin facility currently on hold at the import facility. Drill down is available (e.g., via information in the view 1000) to determine the hold shipments and the reasons for the hold, such as seeing an "OH" code.

The widget 1621 "volume by user" displays the shipments and/or parcels processed by each employee or worker. In some embodiments, the information contained in the widget 1621 is utilized to determine worker productivity as described above for determining whether or not a productivity threshold has been met and/or whether a target deadline will be met. For example, the top three producers DOE JOHN V, DOE JOHN VI, and DOE JOHN VII may each be a part of the same working shift. Given their productivity as illustrated in the widget 1621, it may be determined that one or more sorting actions will occur by a target deadline. Accordingly, the status indicator 610 may be displayed next to the "sort status" indicator.

The widget 1607 "volume by system" displays a quantity of shipments and/or parcels that have occurred or are being processed according to a shipping source (e.g., EDC, IDC, etc.). A shipping "source" can be or include shipping teams, units, divisions, districts, locations, areas, sub-groups, and/or any logical grouping. In some embodiments, the volume quantity as illustrated in the widget 1607 is used for the prediction operations described above, such as determining whether one or more sorting operations will occur by a target deadline, particularly for one or more of the shipping sources.

The widget 1619 "volume by service level" displays current shipments and parcels that have occurred or are being processed according to a service type. For example, a service type can include "air" parcel service, "express" parcel, "expedited" parcel, regular parcel, "overnight" parcel, etc. These service types may indicate how fast mail needs to be processed or sorted in order to meet service type deadlines. In some embodiments, different predetermined or target deadlines for one or more sorting actions can be set according to whether a particular quantity or percentage of shipment actions are associated with a particular type of service. In some embodiments, the information in the widget 1619 can be utilized by the sorting management system for the prediction operations described above. For example, if it is determined that 80% of the remaining workload that needs to be performed corresponds to overnight parcel service, but a large quantity of parcels still need to be sorted, a status indicator may indicate that an associated sorted action will not meet a target deadline.

The widget 1613 "product volume" displays a quantity of current shipments and parcels according to a particular product. The "name" field indicates the identifier for a particular product that has or is needing to be shipped. The particular product identification shows the trends in what is or needs to be shipped and may offer insight into the time it will take to sort the product. For instance, if most of the products are associated with very large packages, it may take longer for a culling action to separate each item according to shape. The particular product identification may be utilized by the sorting management system for the prediction operations described above. For example, if a large quantity or percentage of products are associated with being very large packages, it may be inferred that one or more sorting operations will take longer and according a target date may be pushed back and/or it may be predicted that the target date will be missed based on this information.

It is understood that the particular data values within some or each of the views 5A-15 can originate from one or more sources in any suitable manner. For example, the central computing entity 110 can pull, aggregate, and/or access data from various data sources (e.g., one or more databases) and responsively transmit the data to a client device (e.g., the mobile computing entity 105). The client device may responsively be configured to display the data within some or each of the views 5A-15. In an illustrative example, shipping data (e.g., to track quantity of actual shipments/packages of FIG. 7) may be uploaded from a consignee device to the central computing entity 110 and/or captured from labels when one or more packages arrive at a carrier facility, such that a user (e.g., an intermediate processing location worker) uploads this information to the central computing entity 110. In another illustrative example, the central computing entity 110 can access a parcel tracking system to retrieve employee sort efficiency (e.g., corresponding to PPH of FIG. 11) and responsively stores it in a data store. In another example, the central computing entity 110 can access a Human Resources (HR) system (e.g., database) to track hours, vacation, leaves, etc., which may be relevant, for example, for FIGS. 11-14B.

III. EXEMPLARY SYSTEM OPERATION

As noted above, example embodiments provide various status indicators of a sorting management system user interface. For example, a first status indicator can be displayed, which indicates that one or more sorting operations will not occur by a target deadline. The setting can occur in response to predicting (e.g., via employee productivity levels), whether the one or more sorting operations will not occur by a target deadline.

FIG. 16 is an exemplary flow diagram of a process 1700 illustrating how various status indicators can be set or changed, according to certain embodiments herein. The process 1700 may be performed by processing logic that comprises hardware (e.g., circuitry, dedicated logic, programmable logic, microcode, etc.), software (e.g., instructions run on a processor to perform hardware simulation), firmware, or a combination thereof. For example, some or each of the blocks in the process 1700 may be performed by logic within the central computing entity 110 of FIG. 1. It is understood that although FIG. 16 is described with reference to a particular order and particular quantity of blocks, any quantity of blocks may exist, which flow in any order. For example, in some embodiments, instead of 4 status indicators that are set or changed there may only be one status indicator set or changed in the process 1600. In various embodiments, the blocks 1606, 1612, 1618, and 1624 occur in any order. For example, in some embodiments, block 1624 occurs in response to block 1602 and the decision block 1606 is the last decision block to occur. In some embodiments, some or each of the blocks or processes occur substantially parallel or at substantially the same time, as opposed to any particular order or serial flow.

At block 1602, a user interface of a sorting management system is provided. For example, the main menu as indicated in FIG. 5A and/or a view as represented by the view 600 of FIG. 6 is displayed. In alternative embodiments, the view 600 is displayed except there are fewer identifiers and/or status indicators displayed, such as only the "sort status" identifier with a corresponding status indicator. Accordingly, in various embodiments, each of the identifiers in and/or status indicators in FIG. 6 need not be displayed or provided. In such embodiments where fewer status indicators and/or identifiers are displayed compared to FIG. 6, some of the blocks as illustrated in FIG. 16 need not occur. For example, In some embodiments a view only displaying the "volume status" identifier and its associated status indicator need not include the blocks 1604, 1606, 1608, 1616, 1618, 1620, 1622, 1624, and 1626. Rather, only blocks 1602, 1610, 1612, and 1614 need to occur in such embodiments.

At block 1606, it is determined (e.g., by the central computing entity 110) whether one or more sorting operations will or has occurred by one or more particular times. The "particular time" can correspond to a target deadline and/or some other time (e.g., 1 hour before the target deadline). In an example illustration of block 1606, the predicting actions as described with respect to FIGS. 6-8 may occur. For example, based on one or more employee productivity scores and/or whether a planned package/shipment quantity will be met, it can be predicted whether or not the one or more sorting operations will occur by the particular time(s).

At block 1607, if it is predicted that the one or more sorting operations will not occur by the particular time, a first status indicator can be set or changed accordingly. For example, at a first time, a first status indicator within a first view of a user interface may be set indicating that one or more sorting operations associated with one or more parcels will occur by the particular time, such as a target deadline and/or some other time before the target deadline. At a second time (which is subsequent to the first time), it can be predicted that at least one sorting operation will not occur by the particular time. In response to this predicting, the first status indicator can be changed to a second status indicator within the first view indicating that the one or more sorting operations will not occur by the particular time. In an illustrative example, at the first time described above, the status indicator may be set to the status indicator 610 next to the "sort status" identifier of FIG. 6. However, at or after the second time, the status indicator 610 may be changed to the status indicator 612 next to the "sort status" identifier illustrating that the particular time, such as a target deadline, has already been exceeded. In alternative embodiments, at or after the second time the status indicator 610 may be changed to the status indicator 608 next to the "sort status" indicating that the particular time has been exceeded, such as 1 hour before a target deadline. Per block 1608, if it is predicted that the one or more sorting operations will occur by the particular time, a first status indicator can be set or changed accordingly. For example, if it is determined that one or more sorting operations will occur by both a target deadline and some threshold time before the target deadline (e.g., 30 minutes), the status indicator 610 may be displayed next to the "sort status" identifier.

At block 1612, it is determined (e.g., by the central computing entity 110) whether one or more users have uploaded their data by one or more particular times. For example, referring back to the "volume status" identifier and its associated operations corresponding to FIGS. 6 and 9, it can be determined whether one or more users have uploaded shipping information (e.g., address, parcel, and/or data information) by a particular time, such as a time that a shipper usually uploads data to a computing system.

At block 1614, if the one or more users have not uploaded their data by the one or more particular times, then a second status indicator may be set or changed accordingly. For example, the one or more "particular times" may include or correspond to a particular date that a shipper always uploads data on. Accordingly, the status indicator 612 may be set and provided next to the "volume status" indicating that the one or more users have not uploaded the shipping information to one or more computing devices by the particular date. In alternative embodiments, the one or more "particular times" may include or correspond to a point in time other than the particular date, such as a threshold quantity of days before the date. For example, the status indicator 608 may be provided next to the "volume status" indicating that the one or more users have not uploaded the shipping information to one or more computing devices by the threshold quantity of days. In some embodiments, the one or more particular times are either the same as the one or more particular times described in block 1606 or they are different. Per block 1610, if the one or more users have uploaded their data by the one or more particular times then the second status indicator is set or changed accordingly. For example, if a user has uploaded his data both before the time he usually does (e.g., Tuesday) and before a second time prior to the usual time (e.g., Monday), the status indicator 610 may be provided next to the "volume status" identifier.

At block 1618, it is determined (e.g., by the central computing entity 110) whether one or more shipments or parcels that are on hold have been resolved within one or more particular times. In some embodiments, the particular time(s) in block 1618 is the same time as the particular time(s) described in blocks 1612 and/or 1606. In some embodiments, the particular time(s) in block 1618 is different than the particular time(s) described in blocks 1612 and/or 1606. If one or more shipments are parcels are on "hold," this can correspond to parcels that are on hold that have not been resolved with a particular time and/or parcels that are outbound to a final destination without having been processed completely. In an illustrative example, referring back to FIGS. 6 and 10, it can be determined a particular scan time of a package and the reason for the hold via various holding codes (e.g., EDC, OH, CO, AES). This can be compared against the one or more particular times in order to set a third status indicator.

At block 1620, if any parcels and/or shipments that are on hold have not been resolved by one or more particular times, then a third status indicator can be set or changed accordingly. For example, if the hold has not been resolved by date X, the status indicator 612 may be displayed next to the "service status" identifier of FIG. 6 indicating that immediate attention is needed. Alternatively, if the hold has not been resolved by date Y, the status indicator 608 may be displayed indicating that attention is still needed for the parcel, but not immediate attention. Per block 1616, if any of the parcels and/or shipments that are on hold have been resolved by the one or more particular times, then the third status indicator can be set or changed accordingly. For example, if no parcel or shipment is associated with a hold of any kind, the status indicator 610 may be displayed indicating that there are no holds.

At block 1624, it may be determined (e.g., by the central computing entity 110) whether one or more workers or employees have fallen outside or exceeded an overtime and/or a productivity threshold. For example, referring back to FIGS. 6 and 11-14B, the threshold may correspond to or include one or more workers that have gone into an overtime working period, such as 30 minutes past their regular shift into an overtime period. In some embodiments, the threshold is or includes workers that have not exceeded a particular productivity score, such as the PPH scores illustrated in FIG. 11.

At block 1626, if the one or more workers have not fallen outside of an overtime and/or productivity threshold a fourth status indicator can be set or changed accordingly. For example, if a set of workers surpassed a PPH productivity score and have not gone into overtime, the status indicator 610 may be displayed next to the "workforce status" identifier in FIG. 6. Per block 1622, if the one or more workers have fallen outside of an overtime and/or productivity threshold, then the fourth status indicator can be set or changed accordingly. For the status indicator 608 may be displayed if a worker has fallen below a first percentage of productivity. The status indicator 612 may further be displayed if a worker has fallen below a second percentage of productivity. In another example, the status indicator 608 may be displayed if a worker has gone X time into overtime (e.g., 1 hour). The status indicator 612 may further be displayed if a worker has gone Y time into overtime (e.g., 3 or more hours).

IV. CONCLUSION

Many modifications and other embodiments of the present disclosure set forth herein will come to mind to one skilled in the art to which these embodiments pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method comprising:
causing display, at a first time, of a first status indicator within a first view of a user interface, the first status indicator indicates that one or more sorting operations to sort one or more parcels will finish by a particular predefined time, the sort of the one or more parcels is indicative of organizing, at sorting facility, the one or more parcels in preparation for being shipped to a final destination;
predicting, at a second time, that at least one sorting operation will not finish by the particular predefined time; and
in response to the predicting, causing a change in display of the first status indicator to a second status indicator within the first view of the user interface, the second status indicator indicates that the at least one sorting operation will not finish by the particular predefined time.

2. The method of claim 1, further comprising causing display, in response to a user selection of an identifier associated with the second status indicator, of a second view, the second view describes at least a quantity of time that the at least one sorting operation is projected to exceed one or more target deadlines.

3. The method of claim 1, further comprising causing display, in response to a user selection of an identifier associated with the second status indicator, of a second view, the second view describes a plurality of planned shipment and package quantities and a plurality of actual shipment and package quantities, wherein the predicting is based at least in part on comparing the plurality of planned shipment and package quantities with the plurality of actual shipment and package quantities.

4. The method of claim 1, further comprising determining that one or more workers have fallen below a productivity threshold, wherein the predicting is based at least in part on the one or more workers falling below the productivity threshold.

5. The method of claim 1, further comprising causing display of a third status indicator within the first view, the third status indicator indicates that one or more workers have gone into an overtime working period.

6. The method of claim 1, further comprising causing display of a third status indicator within the first view, the third status indicator indicates that a shipper has not uploaded information to a computing device by a predetermined time.

7. The method of claim 1, further comprising causing display, prior to the displaying of the first status indicator, of a main menu, the main menu includes an identifier that describes a supervisor role, wherein the displaying of the first status indicator occurs in response to a user selection of the identifier.

8. A computer program product comprising at least one non-transitory computer-readable storage medium having computer-executable program code instructions stored therein, the computer-executable program code instructions comprising program code instructions configured to, when executed by a processor of a computing system, cause the computing system to:
display one or more identifiers within a user interface, the one or more identifiers correspond to a management of one or more sorting operations for sorting one or more parcels to be shipped, the one or more sorting operations occurring at a sorting facility;
receive an indication of whether one or more shipments or parcels that have not been completely processed at the sorting facility have been resolved within a predefined time;
display, in response to the receiving, a first status indicator within a first view of the user interface, the first status indicator indicates whether the one or more shipments or parcels that have not been completely processed at the sorting facility have been resolved within the predefined time;
display a second status indicator within the first view of the user interface, the second status indicator corresponds to indicating whether one or more sorting operations have occurred or will occur outside of a target deadline; and
display, in response to a user selection of an identifier associated with the second status indicator, a second view, the second view describes at least a quantity of time that the at least one sorting operation is projected to exceed the one or more target deadlines.

9. The computer program product of claim 8, wherein the program code instructions further cause the computing system to:
display a third status indicator to the first view of the user interface, the second status indicator corresponds to indicating whether one or more users have uploaded shipping data by a particular time; and
display a fourth status indicator to the first view of the user interface, the fourth status indicator corresponds to indicating whether one or more workers have fallen below a productivity threshold and whether the one or more workers have gone into a working overtime period.

10. The computer program product of claim 9, wherein the program code instructions further cause the computing system to display, in response to a user selection of an identifier associated with the third status indicator, a second view, the second view describes how late the one or more users are for the uploading of the shipping information in comparison to the particular time.

11. The computer program product of claim 9, wherein the program code instructions further cause the computing system to display, in response to a user selection of an identifier associated with the fourth status indicator, a second view, the second view describes productivity scores for the one or more workers and a particular quantity of hours that a set of the one or more workers have gone over the working overtime period.

12. The computer program product of claim 8, wherein the program code instructions further cause the computing system to display, in response to a user selection an identifier associated with the first status indicator, a second view, the second view includes a plurality of codes indicating a reason for the hold.

* * * * *